United States Patent
Iinuma

(10) Patent No.: US 8,126,270 B2
(45) Date of Patent: Feb. 28, 2012

(54) IMAGE PROCESSING APPARATUS AND IMAGE PROCESSING METHOD FOR PERFORMING REGION SEGMENTATION PROCESSING

(75) Inventor: Osamu Iinuma, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 778 days.

(21) Appl. No.: 12/206,017

(22) Filed: Sep. 8, 2008

(65) Prior Publication Data

US 2009/0074291 A1    Mar. 19, 2009

(30) Foreign Application Priority Data

Sep. 19, 2007  (JP) ................. 2007-242667

(51) Int. Cl.
  G06K 9/34   (2006.01)
  G06K 9/46   (2006.01)
(52) U.S. Cl. ...................................... 382/178
(58) Field of Classification Search .............. 382/164, 382/165, 167, 173, 176, 178, 180, 181, 190, 382/275, 282, 284; 358/1.5, 1.9, 438, 451, 358/453, 530; 345/428, 619, 660; 707/694
See application file for complete search history.

(56) References Cited

U.S. PATENT DOCUMENTS

| | | | | |
|---|---|---|---|---|
| 5,038,381 A * | 8/1991 | Nelson | | 382/178 |
| 5,640,466 A * | 6/1997 | Huttenlocher et al. | | 382/177 |
| 6,360,010 B1 * | 3/2002 | Hu et al. | | 382/180 |
| 6,549,302 B1 * | 4/2003 | Takeda et al. | | 358/1.9 |
| 6,920,246 B2 * | 7/2005 | Kim et al. | | 382/178 |
| 7,170,647 B2 | 1/2007 | Kanatsu | | |
| 7,177,488 B2 * | 2/2007 | Berkner et al. | | 382/298 |
| 7,218,779 B2 * | 5/2007 | Dodge et al. | | 382/177 |
| 7,266,242 B2 * | 9/2007 | Dolan et al. | | 382/173 |
| 7,424,151 B2 * | 9/2008 | Lin et al. | | 382/173 |
| 7,778,982 B2 * | 8/2010 | Baker | | 707/694 |
| 7,826,665 B2 * | 11/2010 | Bressan et al. | | 382/181 |
| 2005/0111053 A1 | 5/2005 | Yoshida | | |
| 2009/0074291 A1 * | 3/2009 | Iinuma | | 382/178 |

* cited by examiner

Primary Examiner — Amir Alavi
(74) Attorney, Agent, or Firm — Canon USA Inc IP Division

(57) ABSTRACT

An image processing apparatus includes an acquisition unit configured to acquire a document image, a primary region segmentation unit configured to segment the acquired document image into a plurality of regions, a detection unit configured to detect a text region including an erroneous sentence from the regions segmented by the primary region segmentation unit, a secondary region segmentation unit configured to detect a second attribute region partly overlapped with an original sentence of the erroneous sentence and separate the detected region into the second attribute region and a part of the original sentence, and a combining unit configured to combine the part of the original sentence separated by the secondary region segmentation unit with the text region including the erroneous sentence.

18 Claims, 18 Drawing Sheets

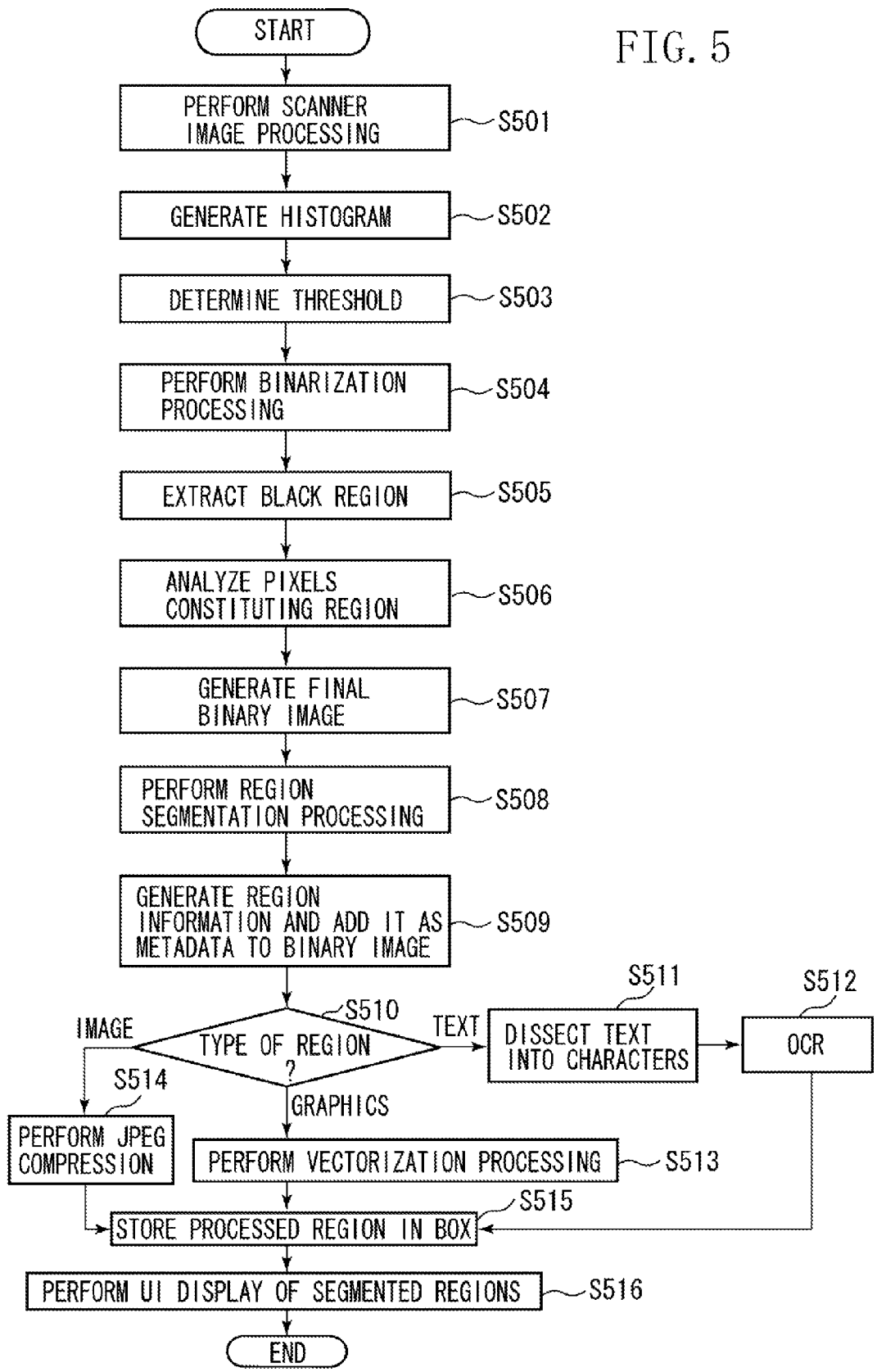

FIG. 7

It will be fine.

FIG. 14

This is sample.
The sample is
a test chart.
The test chart
comprises two
figs.
One is weather
news of day. It will be fine.
The other one
is newspaper.
It is important
for me that the
newspaper is
very new one.
The test finish
now.

IMAGE PROCESSING APPARATUS AND IMAGE PROCESSING METHOD FOR PERFORMING REGION SEGMENTATION PROCESSING

BACKGROUND OF THE INVENTION

1. Field of the Invention

The present invention relates to an image processing apparatus and an image processing method, which can perform region segmentation processing on a document image.

2. Description of the Related Art

Recent digital copying machines have multiple functions including basic functions, such as a COPY function that enables a user to copy a document, a PDL function that enables a user to print a document received from a host computer, and a SEND function that enables a user to send a document from the copying machine to an external device via a network. Furthermore, the copying machines have additional functions, such as a BOX function that enables a user to store a copied document image or a PDL document in a storage device provided in the copying machine, and an EDIT function that enables a user to reuse a document image stored in a BOX (for combination, bookbinding, etc.).

To satisfy the need for high-quality images and higher reproducibility of documents, the resolution for image processing is speedily increasing from 600 dpi or 1200 dpi to 2400 dpi and the bit number of signals is increasing from 8 bits or 10 bits to 12 bits. To this end, copying machines increase their memory (or storage) capacity and install a high-performance central processing unit (CPU) capable of processing bitmap data carrying a great amount of information. Accordingly, the developing and manufacturing costs for the devices are increasing.

Meanwhile, as discussed in U.S. Patent Application Publication No. US 2005/0111053, a conventional image processing method includes separating a read document into a plurality of regions, storing segmented regions, and reusing the segmented regions for editing an image. To this end, an image processing apparatus classifies regions constituting a document into text, graphics, and image regions and processes each classified region according to the attribute of each region.

For example, the image processing apparatus performs vectorization processing on text and graphics regions to store vector data. Furthermore, the image processing apparatus converts an image region into Joint Photographic Experts Group (JPEG) data and stores the JPEG data for editing. The method uses vector data, which is easy to edit and modify, instead of processing high-resolution and multi-bit bitmap data containing a great amount of information. Therefore, the method can reduce the costs and can improve the operability while improving the image quality and usability.

An image processing apparatus discussed in U.S. Pat. No. 7,170,647 performs region segmentation based on a binary image including white and black pixels. An image processing method includes extracting an assembly of black pixel blocks and an assembly of white pixel blocks from a binary image, and identifying text, graphics, and image regions according to the shape, size, and state of each assembly.

If an object document image is a color image, an image processing apparatus converts the color image into a binary image beforehand and performs region segmentation on the obtained binary image. The binarization processing applied to a color image includes obtaining a histogram of a document image and determining a threshold based on a distribution of the brightness (luminance) of pixels. Furthermore, the binarization processing includes comparing the luminance of each pixel constituting the document image with the obtained threshold to convert the pixel into a white pixel or a black pixel.

However, the object-based region segmentation processing, if applied to document data entered from a scanner or transmitted from a personal computer (PC), may fail to accurately segment an image into regions.

Such a problem may arise if an object region includes a background portion (colored partial region) as illustrated in FIG. 3A, because the region segmentation is dependent on the above-described binarization. To solve this problem, the image processing apparatus discussed in U.S. Pat. No. 7,170,647 checks a background color level of each region constituting a document and changes the above-described binarization threshold for each region.

To binarize a color image, the image processing apparatus discussed in U.S. Pat. No. 7,170,647 determines a plurality of thresholds, the total number of which corresponds to the number of background colors, based on a histogram of luminance values obtained from the color image, and produces binary images for respective background colors based on the obtained thresholds.

Accordingly, to process a document having a plurality of background color levels, the image processing apparatus requires a plurality of page memories corresponding to the total number of backgrounds colors. More specifically, the number of memories for removing background colors and performing region segmentation and the number of memories for storing segmented regions are equivalent to "A4 document×number of background colors" if the document is an A4 document.

The image processing apparatus does not display a segmented region individually. Accordingly, a user cannot easily find an erroneously segmented region on a previewed document image. On the other hand, if a user interface (UI) displays each segmented region, the display of an erroneously segmented region may be excessively large.

It is generally difficult to perfectly perform the region segmentation processing. Accordingly, it is required to address a case where regions cannot be automatically segmented. For example, if a region overlapped with a background color has a color similar to the background color, automatically accomplishing the region segmentation processing is difficult. Therefore, an appropriate correction is necessary to obtain a satisfactory result.

SUMMARY OF THE INVENTION

Exemplary embodiments of the present invention are directed to an image processing apparatus and an image processing method, which can reduce a requisite memory capacity and can adequately perform region segmentation processing even if a first attribute region (e.g., text region) is overlapped with a second attribute region.

According to an aspect of the present invention, an image processing apparatus includes an acquisition unit configured to acquire a document image, a primary region segmentation unit configured to segment the acquired document image into a plurality of regions, a detection unit configured to detect a text region including an erroneous sentence from the regions segmented by the primary region segmentation unit, a secondary region segmentation unit configured to detect a second attribute region partly overlapped with an original sentence of the erroneous sentence, and separate the detected region into the second attribute region and a part of the original sentence, and a combining unit configured to combine the part of the original sentence separated by the secondary region segmentation unit with the text region including the erroneous sentence.

According to an aspect of the present invention, an image processing apparatus includes an acquisition unit configured to acquire a document image, a primary region segmentation unit configured to segment the acquired document image into a plurality of regions, a display unit configured to display the regions segmented by the primary region segmentation unit, a unit configured to input information relating to a second attribute region overlapped at least partly with a first attribute region, which is selected by a user from the regions displayed by the display unit, and a secondary region segmentation unit configured to detect the second attribute region overlapped at least partly with the first attribute region based on the input information, and separate the detected region into the second attribute region and at least a part of the first attribute region.

According to yet another aspect of the present invention, a method includes acquiring a document image, segmenting the acquired document image into a plurality of regions, detecting a text region including an erroneous sentence from the segmented regions, detecting a second attribute region partly overlapped with an original sentence of the erroneous sentence, separating the detected region into the second attribute region and a part of the original sentence, and combining the separated part of the original sentence with the text region including the erroneous sentence.

According to yet another aspect of the present invention, a method includes acquiring a document image, segmenting the acquired document image into a plurality of regions, displaying the segmented regions, inputting information relating to a second attribute region overlapped at least partly with a first attribute region, which is selected by a user from the displayed regions, detecting the second attribute region overlapped at least partly with the first attribute region based on the input information, and separating the detected region into the second attribute region and at least a part of the first attribute region.

An exemplary embodiment of the present invention can store, for each region, metadata corresponding to the region in a storage device. Furthermore, a color multifunction peripheral (MFP), configured to reuse regions stored in a storage device, can automatically detect an erroneously segmented region and can automatically correct error(s) in a preceding region segmentation by additionally performing the region segmentation on the erroneously segmented region according to different conditions.

Moreover, in the case of failing to automatically accomplish the region segmentation, an exemplary embodiment of the present invention enables a user to manually designate an object region to be corrected. Thus, the exemplary embodiment can provide a region segmentation method that meets user's preference.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 5 is a flowchart illustrating primary region segmentation processing according to an exemplary embodiment of the present invention.

FIG. 7 illustrates characters dissected according to an exemplary embodiment of the present invention.

FIG. 14 illustrates an example document according to an exemplary embodiment of the present invention.

DETAILED DESCRIPTION OF THE EMBODIMENTS

Figure 1:
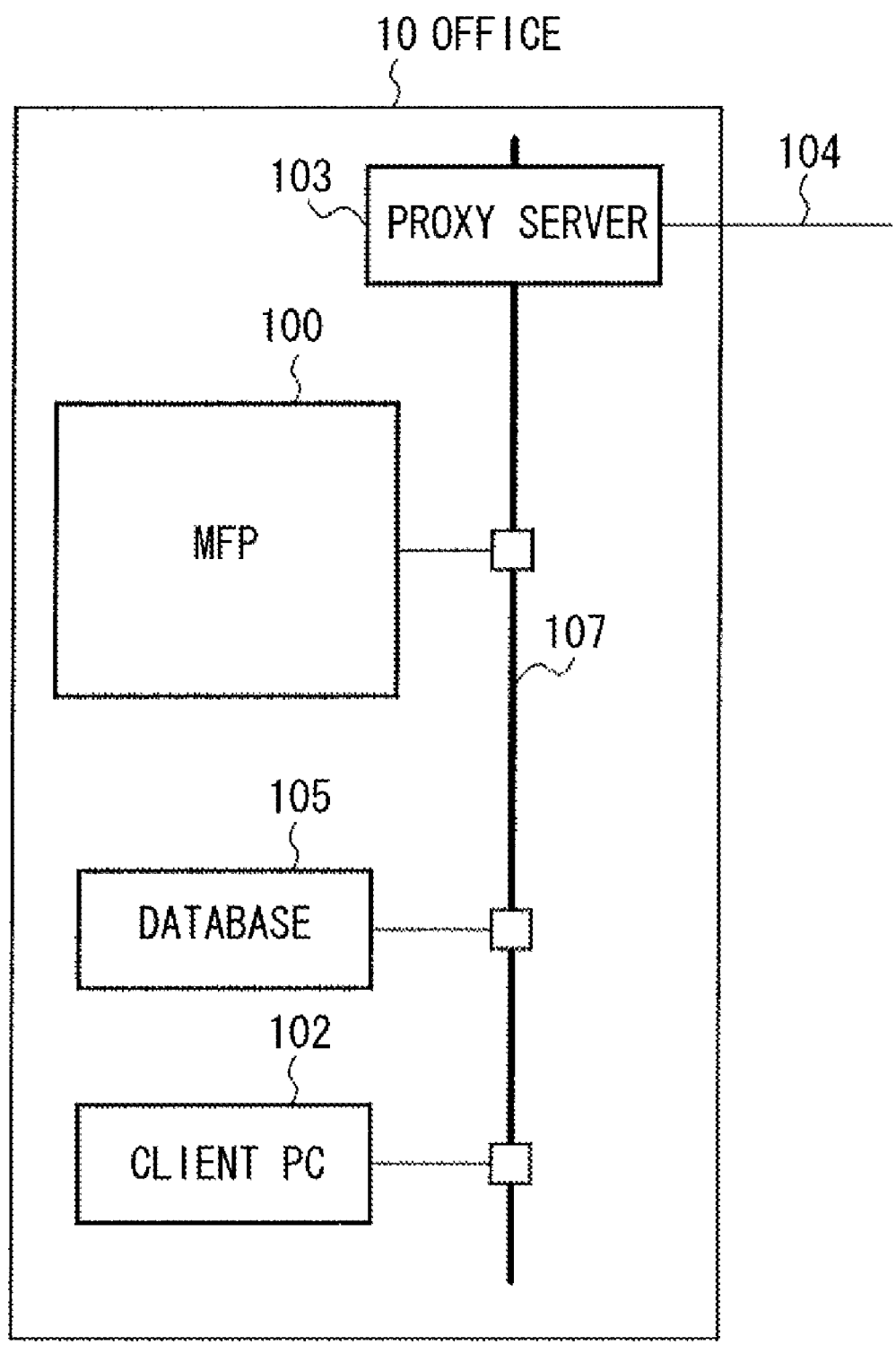
FIG. 1 is a block diagram illustrating an example image processing system according to an exemplary embodiment of the present invention.

The following description of exemplary embodiments is illustrative in nature and is in no way intended to limit the invention, its application, or uses. Processes, techniques, apparatus, and systems as known by one of ordinary skill in the art are intended to be part of the enabling description where appropriate. It is noted that throughout the specification, similar reference numerals and letters refer to similar items in the following figures, and thus once an item is described in one figure, it may not be discussed for following figures. Various exemplary embodiments, features, and aspects of the invention will now herein be described in detail below with reference to the drawings.

Exemplary embodiments of the present invention are directed to image processing apparatuses (e.g., color multifunction peripherals and personal computers), which can store segmented regions in a storage device and can reuse the segmented regions. An image processing apparatus according to an exemplary embodiment of the present invention performs region segmentation on a document image and performs sentence analysis on a text region. More specifically, the image processing apparatus performs primary region segmentation processing for segmenting a document image into a plurality of regions and performs sentence analysis on each sentence included in a segmented text region.

Then, if the sentence analysis result predicts or indicates the presence of any erroneous sentence in a text region, the image processing apparatus performs secondary region segmentation processing on a region existing around the text region. For example, an erroneous sentence is detectable from a region where an original sentence of a text is partly overlapped with an image region or a graphics region. Accordingly, the image processing apparatus detects another attribute region partly overlapped with the above-described original sentence, and performs secondary region segmentation on the detected another attribute region. Then, the image processing apparatus separates a part of the original sentence from the detected attribute region. For example, the image processing apparatus checks a background color level of each region existing around the text region and sufficiently removes a background portion. Then, the image processing apparatus again performs region segmentation processing.

If there is any text region segmented by the above-described secondary region segmentation, the image processing apparatus adds text region information to the segmented text region. In addition to the text region information, the image processing apparatus combines the newly segmented text region with the text region determined as erroneous in the above-described sentence analysis (the text region including an erroneous sentence). As a result, the image processing apparatus can correctly perform sentence analysis and can accurately perform a UI display of detected regions. In other words, the image processing apparatus can obtain a correct sentence by combining a part of the original sentence separated by the secondary region segmentation with the text region including an erroneous sentence.

Figure 4:
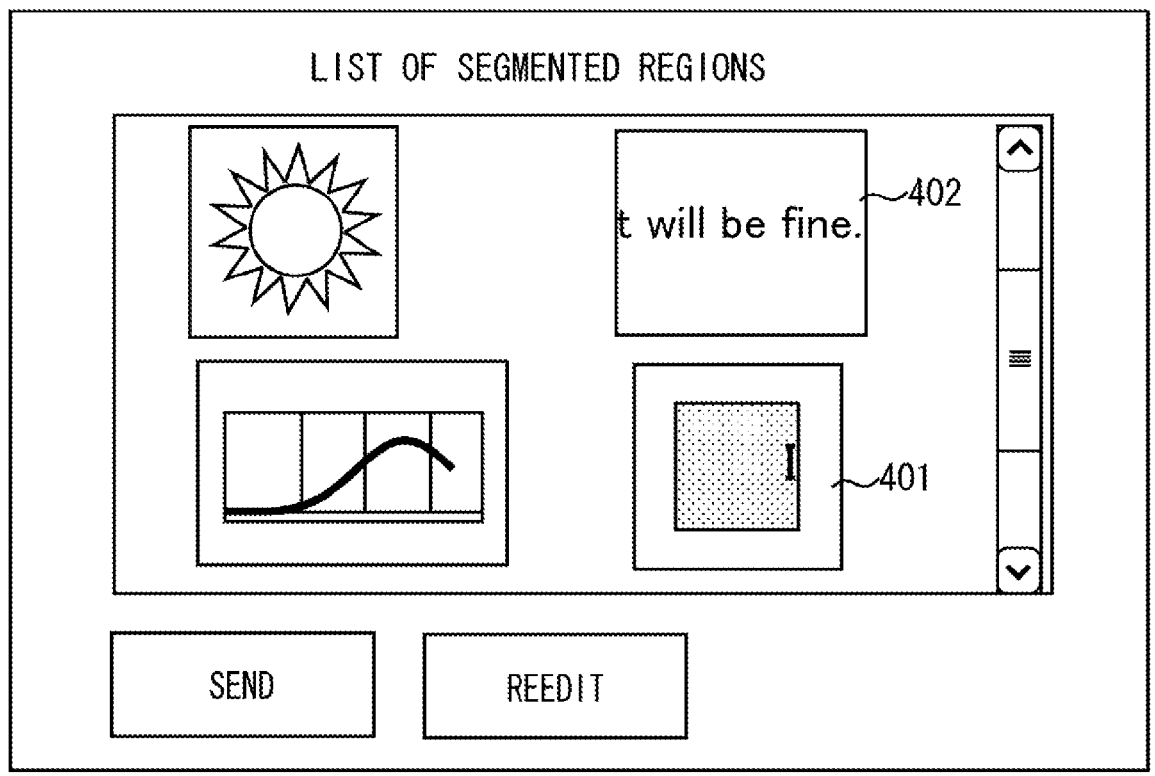
FIG. 4 illustrates an example list of segmented regions displayed on a UI screen of the MFP.

According to an exemplary embodiment of the present invention, a user can select a to-be-corrected region from the regions obtained by the primary region segmentation processing. For example, if a selected mode enables a user to view segmented regions independently displayed as illustrated in FIG. 4, the user can easily confirm a region if the region is erroneously segmented. In this case, a display device displays segmented objects (regions) on its UI screen. A user selects an erroneously segmented region and designates a to-be-separated portion and a background portion. Then, the image processing apparatus performs processing for leaving only a color representing the to-be-separated portion to facilitate region segmentation and performs the above-described secondary region segmentation processing.

According to an exemplary embodiment, a user can perform the secondary region segmentation processing before selecting a to-be-corrected region. More specifically, if the secondary region segmentation processing is unsuccessful, the segmentation result illustrated in FIG. 4 is obtainable depending on the setting for region segmentation. In this case, a user can select the above-described to-be-corrected region by inputting an instruction for the above-described selection processing. The image processing apparatus again performs the region segmentation (third region segmentation).

The above-described selection processing is effective when an object of the secondary region segmentation is a non-text region.

Figure 3A:
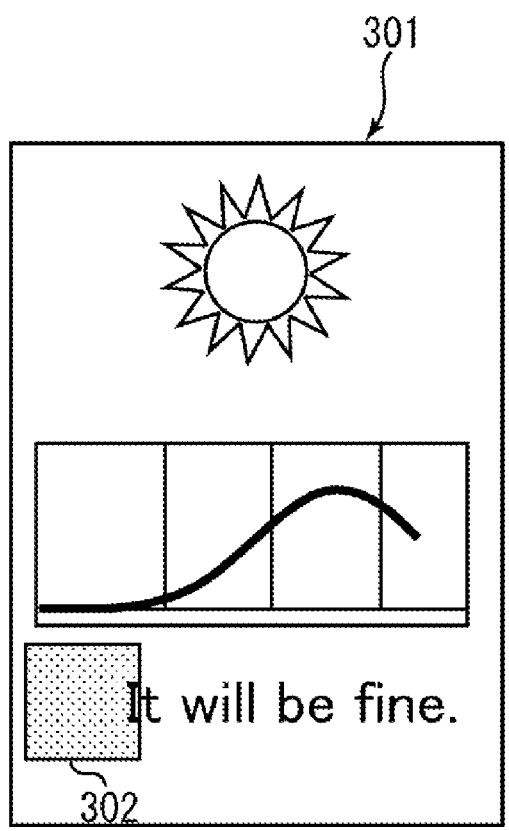
FIG. 3A illustrates an example document.
Figure 3B:
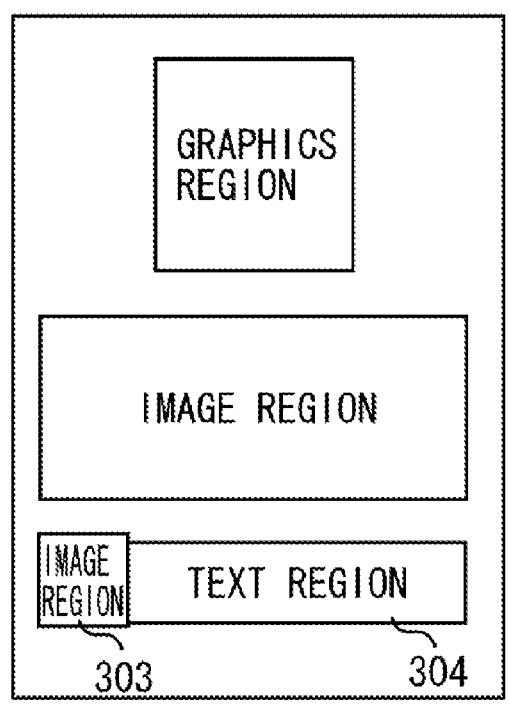
FIG. 3B illustrates an example result of region segmentation applied to a document.

It is desirable to provide a display device capable of performing a UI display of a result of the above-described primary region segmentation. For example, FIG. 3B illustrates segmented regions obtained by the region segmentation processing performed on a document image 301 illustrated in FIG. 3A. More specifically, the document image 301 includes an image region 302 (colored background region) overlapped with a part (character "I") of a character string ("It will be fine"). As illustrated in FIG. 3B, the image region 302 including the character "I" is detectable as an independent region when the image processing apparatus performs region segmentation on the document image 301 illustrated in FIG. 3A.

In such a case, the display device displays segmented regions on its UI screen as illustrated in FIG. 4, to let a user easily recognize an erroneously segmented region (e.g., a text region including an erroneously sentence). Thus, the user can easily perform the above-described selection. As a result, the image processing apparatus can perform region segmentation easily and appropriately.

As described above, if the primary region segmentation obtains two overlapped regions, an exemplary embodiment of the present invention performs the secondary region segmentation on the overlapped regions. For example, if the document image 301 includes two background colors (a background color (white color) and a color of the image region 302 illustrated in FIG. 3A), the exemplary embodiment does not require a large memory capacity comparable to two pages. Therefore, the exemplary embodiment can reduce a requisite memory capacity and can adequately perform the region segmentation.

According to an exemplary embodiment of the present invention, a user can adequately separate a first attribute region and a second attribute region by performing the above-described selection, even if the first attribute region is completely involved in the second attribute region. More specifically, a user selects the second attribute region overlapped at least partly with the first attribute region. The image processing apparatus performs the secondary region segmentation on a region selected by the user.

In the following description, the "region" is an object portion having predetermined features, such as a text (an assembly of character strings), graphics, and an image, which constitutes a document image. Accordingly, a document image includes a text region (a portion corresponding to a text), a graphics region (a portion corresponding to graphics), and an image region (a portion corresponding to an image).

In the following description, the "attribute (region attribute)" indicates a category to which a region belongs. A text region has an attribute indicating a text. A graphics region has an attribute indicating graphics. An image region has an attribute indicating an image.

First Exemplary Embodiment

FIG. 1 is a block diagram illustrating an image processing system according to the first exemplary embodiment of the present invention. The image processing system can be realized in an environment including an office 10 connected to a network 104 (e.g., Internet).

A multifunction peripheral (MFP) 100, connected to a local area network (LAN) 107 provided in the office 10, is capable of realizing a plurality types of functions (copy function, print function, transmission (or sending) function, etc.).

A client PC 102 can use the MFP 100 and a database 105 via the LAN 107. A proxy server 103 connects the LAN 107 to the network 104.

The system arrangement illustrated in FIG. 1 is a mere example. The number of offices is not limited to only one. The network 104 is, for example, the Internet, a local area network (LAN), a wide area network (WAN), a telephone line, a dedicated digital circuit, an asynchronous transfer mode (ATM), or a frame relay circuit. Furthermore, a communication satellite line, a cable television line, a data broadcasting wireless line, or a combined communication network is also usable as the network 104. In other words, the network 104 can be any type of network capable of realizing transmission/reception of data.

The client PC 102 includes a central processing unit (CPU), a random access memory (RAM), a read only memory (ROM), a hard disk, an external storage device, a network interface, a display device, a keyboard, and a mouse, which are standard components equipped in or associated with a general computer.

Figure 2:
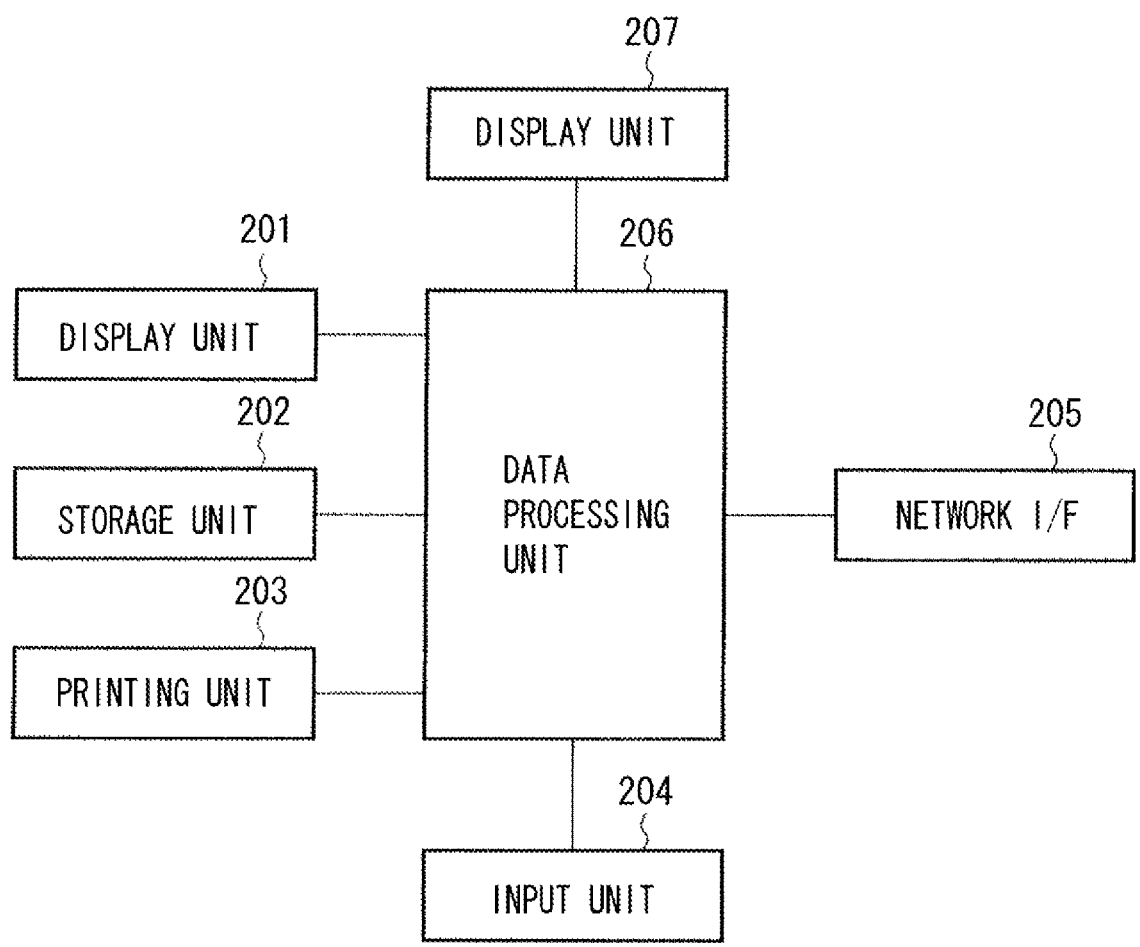
FIG. 2 is a block diagram illustrating an example multi-function peripheral (MFP) according to an exemplary embodiment of the present invention.

FIG. 2 is a block diagram illustrating an example arrangement of the MFP 100 according to an exemplary embodiment of the present invention. In FIG. 2, a data processing unit 206 includes a control unit (not illustrated) including a central processing unit (CPU) that executes various processing (calculations, controls, determinations, etc.) The control unit includes a read only memory (ROM), which stores control programs according to which the CPU can execute the processing described with reference to FIGS. 5, 12, and 17. The control unit includes a random access memory (RAM), which temporarily stores input data and processing data in relation to the above-described various processing performed by the CPU.

The data processing unit 206 can communicate with an image reading unit 201, a storage unit 202, a printing unit 203, an input unit 204, a network interface (I/F) 205, and a display unit 207. The above-described control unit integrally controls the above-described units.

The image reading unit 201 includes an automatic document feeder (ADF). An example of the image reading unit 201 is a scanner. The image reading unit 201 includes a light source (not illustrated) of light emitted toward one piece or a bundle of a document, a lens that forms a document reflection image, and a solid-state image sensor that generates a bitmap image reading signal representing bitmap data having a predetermined resolution (e.g., 600 dpi).

The MFP 100 has a copy function for causing the printing unit 203 to print an image corresponding to the image reading signal on a recording medium. When the MFP 100 copies a document image, the data processing unit 206 performs image processing on the image reading signal to generate a recording signal and the printing unit 203 prints an image on a recording medium according to the recording signal. When the MFP 100 copies a plurality of document images, the storage unit 202 temporarily stores a recording signal for each page. The printing unit 203 successively prints an image on a recording medium according to the recording signal received from the storage unit 202. The data processing unit 206 acquires a document image based on image data acquired by the image reading unit 201.

When the MFP 100 performs communications via the network I/F 205 with other devices, the data processing unit 206 converts bitmap data obtained by the image reading unit 201 into object data and sends the object data to the database 105. When the MFP 100 reuses object data stored in the database 105, the data processing unit 206 receives object data from the database 105 via the network I/F 205. Furthermore, the MFP 100 can convert an image into an image file that can store vector data (e.g., an XML Paper Specification (XPS) file or a Portable Document Format (PDF) file), and can transfer the image file to the client PC 102. In this case, the MFP 100 receives an image from the client PC 102 or another external apparatus via a network, and the data processing unit 206 acquires a document image based on the input data.

More specifically, in an exemplary embodiment, the MFP 100 acquires a document image based on image data obtained by the image reading unit 201 or received via a network, or input from a portable medium (magnetic disk, optical disk, flash memory, etc.).

When the MFP 100 causes the printing unit 203 to perform print processing, the data processing unit 206 can receive print data from the client PC 102 via the network I/F 205. In this case, the data processing unit 206 converts the received print data into a recording signal, according to which the printing unit 203 can perform print processing on a printing medium.

In an exemplary embodiment, the printing unit 203 is a printer or a comparable image forming apparatus. An image forming method is, for example, an electrophotographic printing method using a photosensitive drum or a photosensitive belt, or an inkjet printing method using an array of micro nozzles to discharge ink droplets to a recording sheet, or any other printing method capable of forming an image on a recording medium.

The input unit 204 enables a user to input instructions to the MFP 100. The control unit incorporated in the data processing unit 206 performs controls based on the instructions. The display unit 207 displays the state of a user's input and displays currently processed image data.

The storage unit 202 includes a storage area that stores region data (region information), if obtained in later-described processing, and an image-processing buffer that the data processing unit 206 can use for various image processing. Furthermore, the storage unit 202 includes an image-editing buffer that stores copied region data as image-editing data when the data processing unit 206 performs image editing processing on the above-described region data.

Figure 6A:
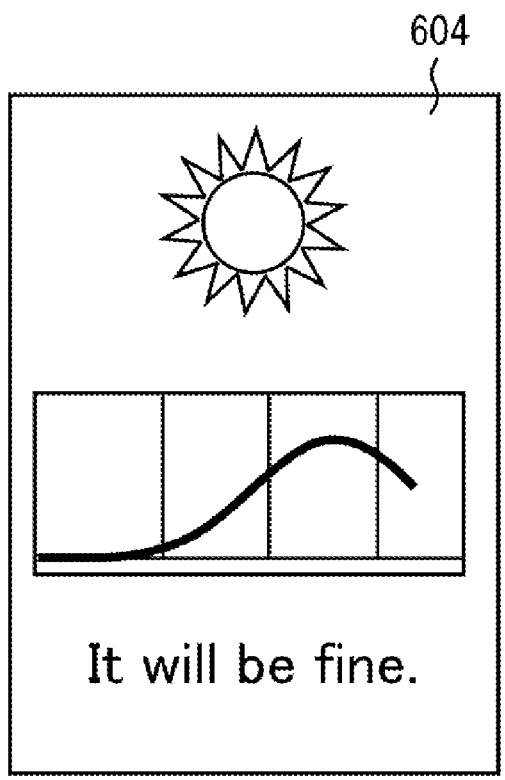
FIG. 6A illustrates an example document according to an exemplary embodiment of the present invention.

FIG. 5 is a flowchart illustrating primary region segmentation processing according to an exemplary embodiment of the present invention. FIG. 6A illustrates a document image 604 read by the image reading unit 201 of the MFP 100.

In step S501, the data processing unit 206 performs scanner image processing on a bitmap image read by the image reading unit 201 to obtain a document image (scan image). The scanner image processing includes color processing and filter processing for noise reduction.

In step S502, the data processing unit 206 generates a histogram to check a color value distribution of a document image. In step S503, the data processing unit 206 determines a binarization threshold used in step S504 based on the generated histogram according to a predetermined standard. A conventional technique is usable to realize the binarization threshold determination processing based on the histogram distribution.

In step S504, the data processing unit 206 performs binarization processing on the document image referring to the binarization threshold determined in step S503, and generates a binary image.

In step S505, the data processing unit 206 detects a black region (classified by the above-described binarization processing) from the binary image. The black region represents black pixels consecutively arranged.

In step S506, the data processing unit 206 analyzes the black region. The analysis includes checking the presence of a reversed character constituted by a black background and a white character. For example, the data processing unit 206 analyzes the pixel density of a black pixel. The data processing unit 206 checks the presence of a white region involved in a black region or checks the size of a black region. Thus, the data processing unit 206 can determine the attribute of the black region, which is a text region, an image region, a graphics region, or a table region. The data processing unit 206 can determine the presence of a reversed text region.

In step S507, the data processing unit 206 generates a final binary image (bitmap image). In this case, the data processing unit 206 can reverse the white and black pixels constituting a reversed text region to obtain a text image suitable for optical character recognition (OCR) processing.

In step S508, the data processing unit 206 divides the final binary image acquired in step 507 into a plurality of regions. Namely, the data processing unit 206 performs primary region segmentation. If consecutive black pixels having the text attribute are present near the consecutive black pixels determined as having text attribute in step S506 in the row (horizontal) direction or in the column (vertical) direction, the data processing unit 206 determines that these pixels belong to the same text region and extracts them as one text region.

Figure 6B:
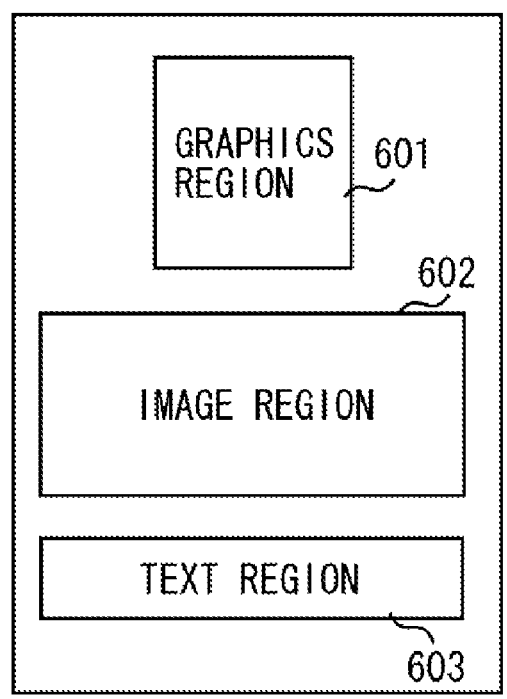
FIG. 6B illustrates a result of the region segmentation applied to the document illustrated in FIG. 6A.

For example, if the data processing unit 206 performs region segmentation processing on the image illustrated in FIG. 6A, the data processing unit 206 can obtain a text region 603, a graphics region 601, and an image region 602 as illustrated in FIG. 6B. An exemplary embodiment can use another method for executing the region segmentation processing (region division processing).

In step S509, the data processing unit 206 generates region information and region-related information as metadata for respective regions segmented in step S508. The data processing unit 206 adds the metadata to the final binary image. More specifically, the data processing unit 206 associates the generated region information with the region-related information.

In the following description, the "region information" indicates the attribute of an object region. For example, when an object region segmented in step S508 is a text region, its region information indicates that the object region is a text region.

In the following description, the "region-related information" indicates positional data and features (coordinates values, size, etc.) of an object region in a document image.

In step S510, the data processing unit 206 determines whether an object region is a text region, an image region, or a graphics region with reference to the above-described metadata, for each of the first segmented regions.

If in step S510 the object region is an image region, the processing proceeds to step S514. In step S514, the data processing unit 206 extracts an image region from a corresponding position on the original document image obtained in step S501 based on the region-related information included in the above-described metadata. Then, the data processing unit 206 performs JPEG compression processing on the extracted image region. In step S515, the data processing unit 206 stores the JPEG compressed image region data in a BOX (the storage unit 202) while associating the data with a saving file.

If in step S510 the object region is a graphics region, the processing proceeds to step S513. In step S513, the data processing unit 206 performs vectorization processing on the region data. More specifically, the data processing unit 206 extracts a graphics region from the above-described final binary image based on the region-related information included in the above-described metadata, and performs vectorization processing on the extracted graphics region. A conventional technique is usable to perform the vectorization processing.

For example, the data processing unit 206 can convert the graphics region into vector data (path data) based on the contour of black pixels in the binary image. Furthermore, the data processing unit 206 can determine a representative color based on the color of a document image corresponding to the position of the graphics region. The data processing unit 206 adopts the determined representative color as a color of the vector data. In step S515, the data processing unit 206 stores the graphics region having been subjected to the vectorization processing as path data in a BOX.

Figure 7:
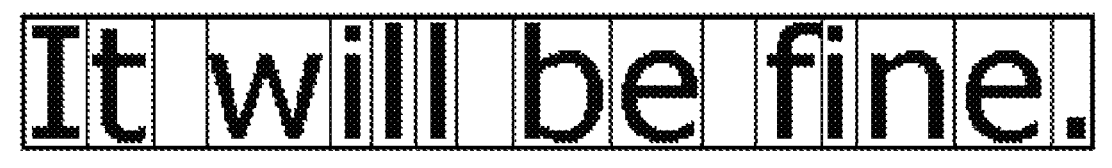

If in step S510 the object region is a text region, the processing proceeds to step S511. In step S511, the data processing unit 206 dissects a word or a sentence into individual characters as illustrated in FIG. 7, which is generally referred to as "character dissecting (character extracting)" processing. More specifically, the data processing unit 206 extracts the text region from the above-described final binary image based on the region-related information included in the above-described metadata, and performs the above-described character dissecting processing on the extracted text region.

Then, in step S512, the data processing unit 206 performs OCR processing on the text region (bitmap image) having been subjected to the character dissecting processing in step S511 and obtains character code information. In step S515, the data processing unit 206 stores the code information obtained through the OCR processing in step S512 in a BOX. Furthermore, in step S513, the data processing unit 206 performs vectorization processing on the text region data having been subjected to the character dissecting processing in step S511. In step S515, the data processing unit 206 stores the text region having been subjected to the vectorization processing as path data in a BOX.

The following first and second methods are usable in combination to vectorize the text region. The first method includes recognizing a font type to associate font information (vector font) with a character code resulting from the character recognition and generating vector data. The second method includes generating vector data based on the contour of a text image, similar to the method applied to a graphics region.

Figure 8:
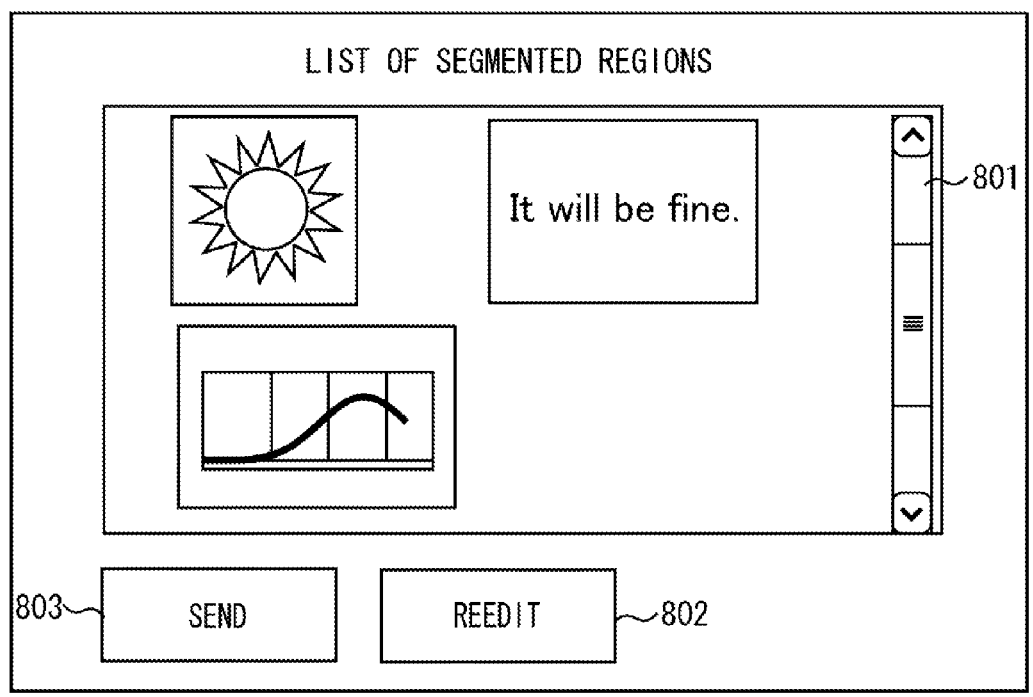
FIG. 8 illustrates an example list of segmented regions displayed on a UI screen of the MFP according to an exemplary embodiment of the present invention.
Figure 9:
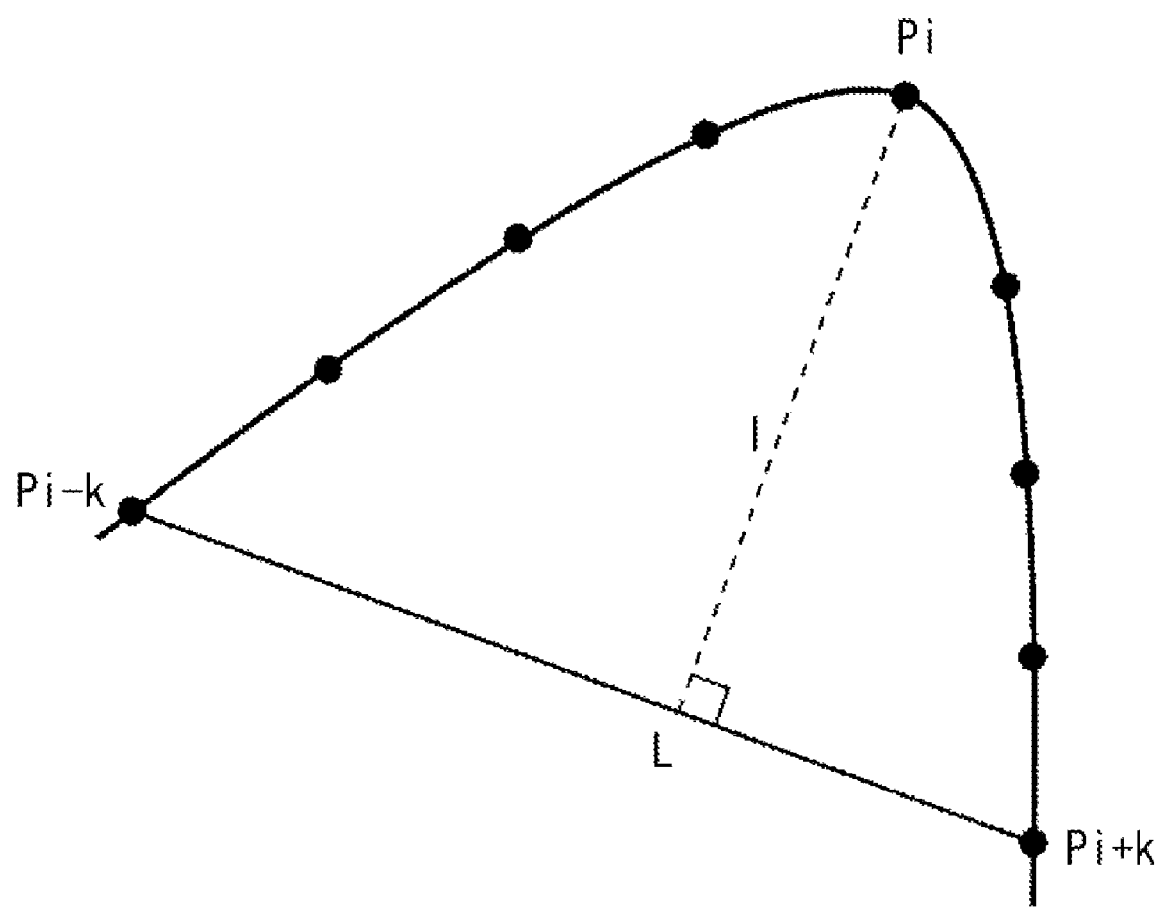
FIG. 9 illustrates vectorization processing according to an exemplary embodiment of the present invention.

Finally, in step S516, the data processing unit 206 causes the display unit 207 to display each segmented region. FIG. 8 illustrates the UI screen of the display unit 207, which displays an example list of segmented regions.

An exemplary embodiment performs vectorization processing on text regions and graphics regions and performs JPEG compression on image regions. The amount of data for the editing processing is small. Therefore, the exemplary embodiment can reduce the cost and can improve the operability.

In particular, an exemplary embodiment of the present invention reduces a memory capacity for the region segmentation and effectively performs the region segmentation. More specifically, the present invention is applicable to a system that does not perform the above-described vectorization processing and the compression processing. In this case, in step S510, the data processing unit 206 extracts each region from the final binary image based on metadata and stores the extracted data in the storage unit 202.

In the region segmentation (steps S504 to step S508), the data processing unit 206 binarizes a document image into white and black regions and extracts a pixel block (a block of pixels) having a contour constituted by consecutive black pixels. If the extracted block has a large area, the data processing unit 206 extracts an internal pixel block having a contour constituted by consecutive white pixels. Furthermore, if the extracted block is still larger than a predetermined size, the data processing unit 206 extracts a pixel block having a contour constituted by consecutive black pixels.

The data processing unit 206 classifies respective pixel blocks having the contour constituted by consecutive black pixels into regions having different attributes according to the size and the shape. For example, if the pixel block has an aspect ratio equal or closer to 1 and has a size in a predetermined range, the data processing unit 206 regards the pixel block as a region comparable to a text region. Furthermore, if there is a group of characters aligned regularly, the data processing unit 206 classifies the pixel block as a text region. If there are some discrete pixel blocks having different sizes, the data processing unit 206 classifies this region as an image region. Moreover, the data processing unit 206 classifies a region including pixel blocks having arbitrary shapes as a graphics region. In this manner, the data processing unit 206 separates a document image into a plurality of regions (performs primary region segmentation processing).

A conventional OCR technology is usable to perform the OCR processing in step S512.

When the data processing unit 206 performs character recognition processing on a text region, the data processing unit 206 determines whether an object character block is horizontal writing or vertical writing. Then, the data processing unit 206 extracts a character string in a corresponding direction, and dissects the character string into characters to acquire an image of each character.

To identify horizontal writing/vertical writing, the data processing unit 206 obtains horizontal/vertical projections relative to pixel values in the object character block and identifies the block as a horizontal writing block if the dispersion of the horizontal projection is large and as a vertical writing block if the dispersion of the vertical projection is large.

If an object region is a horizontal writing text region, the data processing unit 206 dissects the region into character strings according to the horizontal projection and then dissects each character string into individual characters according to the vertical projection. On the other hand, if an object region is a vertical writing text region, the data processing unit 206 dissects the region into character strings according to the vertical projection and then dissects each character string into individual characters according to the horizontal projection. In this case, the data processing unit 206 can detect the size of each character.

In the character recognition processing, the data processing unit 206 performs character recognition on the image of each character dissected from the text region according to a pattern matching method and acquires a corresponding character code. In particular, the character recognition processing includes comparing an observational feature vector, which includes a plurality of numerical sequences of a dozens of dimensions, converted from features of a character image with a dictionary feature vector obtained beforehand for each character type, and identifying the closest character type as a recognition result.

A conventional method is usable to extract an observational feature vector. For example, a conventional method including dividing a character with a mesh pattern and counting the number of line elements representing the character line in each mesh block for each direction to obtain a mesh number dimension vector.

In the vectorization processing (step S513), the data processing unit 206 performs the vectorization processing on a text region in the following manner. The vectorization processing performed by the data processing unit 206 includes vectorization utilizing font recognition and vectorization utilizing the contour of a character image which are usable in combination.

The data processing unit 206 prepares a plurality of dictionary feature vectors corresponding to the number of character type so as to meet a character shape type (i.e., font type), which are used in the character recognition processing. The data processing unit 206 outputs a font type together with a character code to ease recognition of a character font in performing matching.

The data processing unit 206 converts the information relating to a character portion into vector data, with reference to the character code and the font information obtained by the above-described character recognition processing and the font recognition processing and based on outline data (vector font) for each font prepared beforehand. More specifically, the data processing unit 206 can reproduce a text region based on a character code, a font type, and a vector font. If the document image is a color image, the data processing unit 206 extracts a color of each character from the color image and records extracted color information together with the vector data.

If a character recognition result is unreliable (similarity is low), conversion into vector data based on the contour of a character image is effective to realize accurate reproduction, rather than using outline data of a font. The vectorization processing based on the contour of a character image is similar to the vectorization processing applied to a graphics region. The following is example vectorization processing applied to a graphics region.

The data processing unit 206 converts a graphics region into vector data based on the contour of a pixel block extracted in the block.

More specifically, the data processing unit 206 obtains a point sequence (consecutive points arrayed at predetermined intervals) from a pixel sequence representing the contour. The data processing unit 206 breaks the point sequence at each point corresponding to a corner, and obtains a straight line or a curve approximating each segment. The corner is a point where the radius of curvature is maximized. The data processing unit 206 obtains a point where a distance "1" between a chord L and the point Pi is maximized, when the chord L is a straight line connecting points Pi−k and Pi+k (i.e., two points distant from an arbitrary point Pi by an amount equivalent to k times the interval)

When R represents the ratio of a chord length to an arc length between two points Pi−k and Pi+k, the data processing unit 206 regards a point as a corner if the value of R is equal to or less than a predetermined threshold. The data processing unit 206 can vectorize each segment using a least squares method applied to the point sequence if the segment is a straight line, or using a cubic spline function if the segment is a curve.

If an object has an inner contour (i.e., when a white pixel block is present in a black pixel block), the data processing unit 206 similarly obtains a straight line or a curve approximating a point sequence of a white pixel contour extracted by the region segmentation processing.

As described above, the segmented contour line approximation is usable to vectorize the outline of an arbitrary shape. When the document image is a color image, the data processing unit 206 extracts a color of a figure from the color image and records extracted color information together with the vector data.

Figure 10:
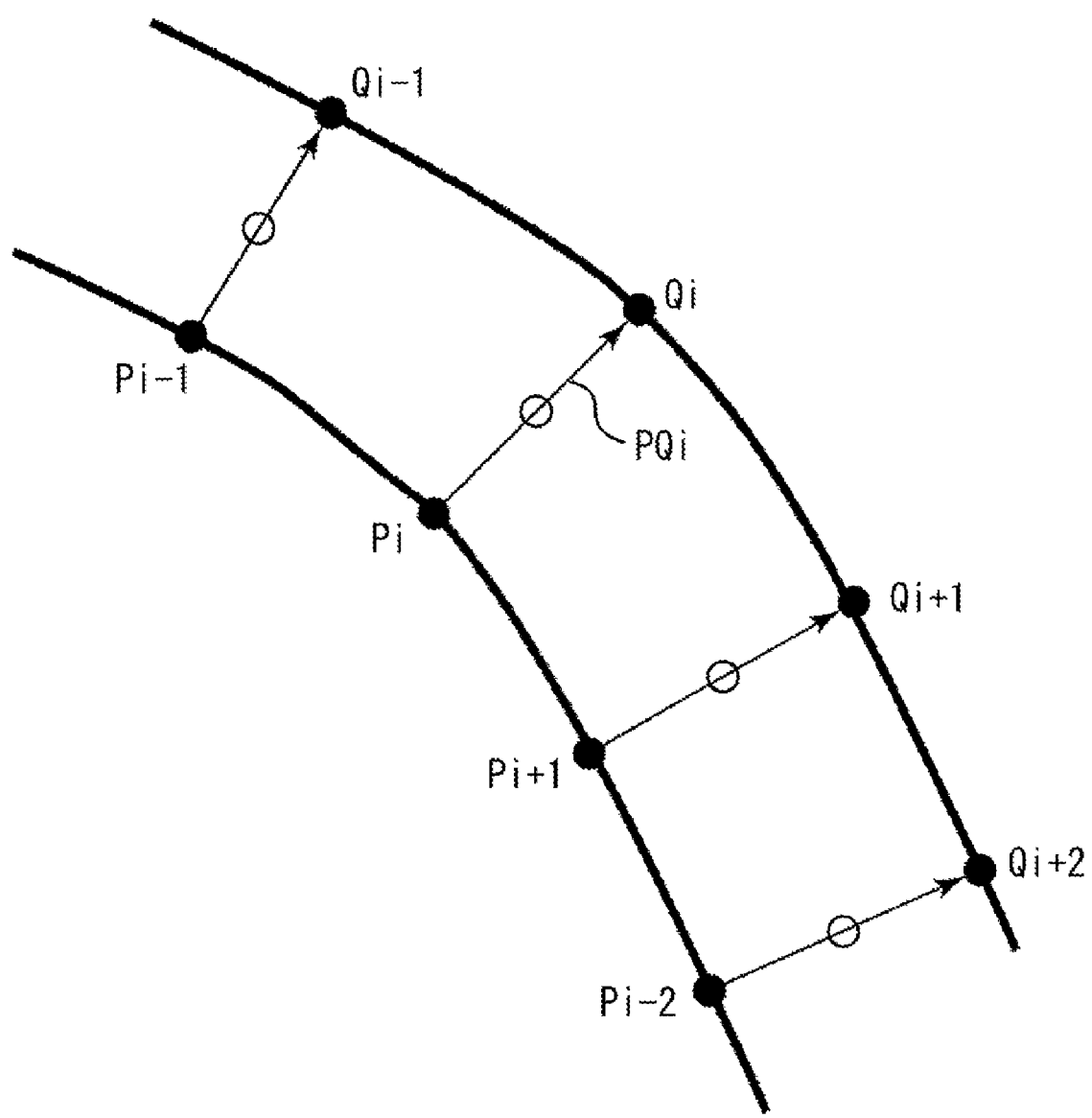
FIG. 10 illustrates vectorization processing according to an exemplary embodiment of the present invention.

Furthermore, as illustrated in FIG. 10, if an outer contour is adjacent to a corresponding inner contour or another outer contour, two contour lines can be integrally expressed as a line having a significant thickness (line width information and one contour line).

More specifically, the data processing unit 206 draws a straight line connecting a point Pi on one contour to a closest point Qi on another contour. If an average value of the distance PQi is less than a predetermined value, the data processing unit 206 obtains a straight line or a curve approximating a point sequence connecting midpoints of PQi and obtains a thickness (line width) representing an average value of PQi. Thus, the data processing unit 206 can effectively vectorize lines and an assembly of lines, which form a graphics region or ruled lines, as an assembly of thickened lines.

As described above, the data processing unit 206 performs vectorization processing on a text region based on character recognition processing. The data processing unit 206 identifies a character closest to a character type in a dictionary as a recognition result. However, if the distance is equal to or greater than a predetermined value (when the similarity is low), the recognition result may be incorrect.

Therefore, similar to the processing applied to a graphics region (line drawing), an exemplary embodiment vectorizes the outline of a text region based on the contour of a character image. Namely, the exemplary embodiment can perform outline-based vectorization processing capable of accurately reflecting a visual aspect of image data. Thus, the exemplary embodiment can accurately vectorize a character even when the conventional character recognition processing fails to recognizes the character. In general, an image region (e.g., a photo) has a complicated shape that requires a great amount of vectorization data. Therefore, the data processing unit 206 performs JPEG compression on image data and does not execute vectorization.

Figure 11:
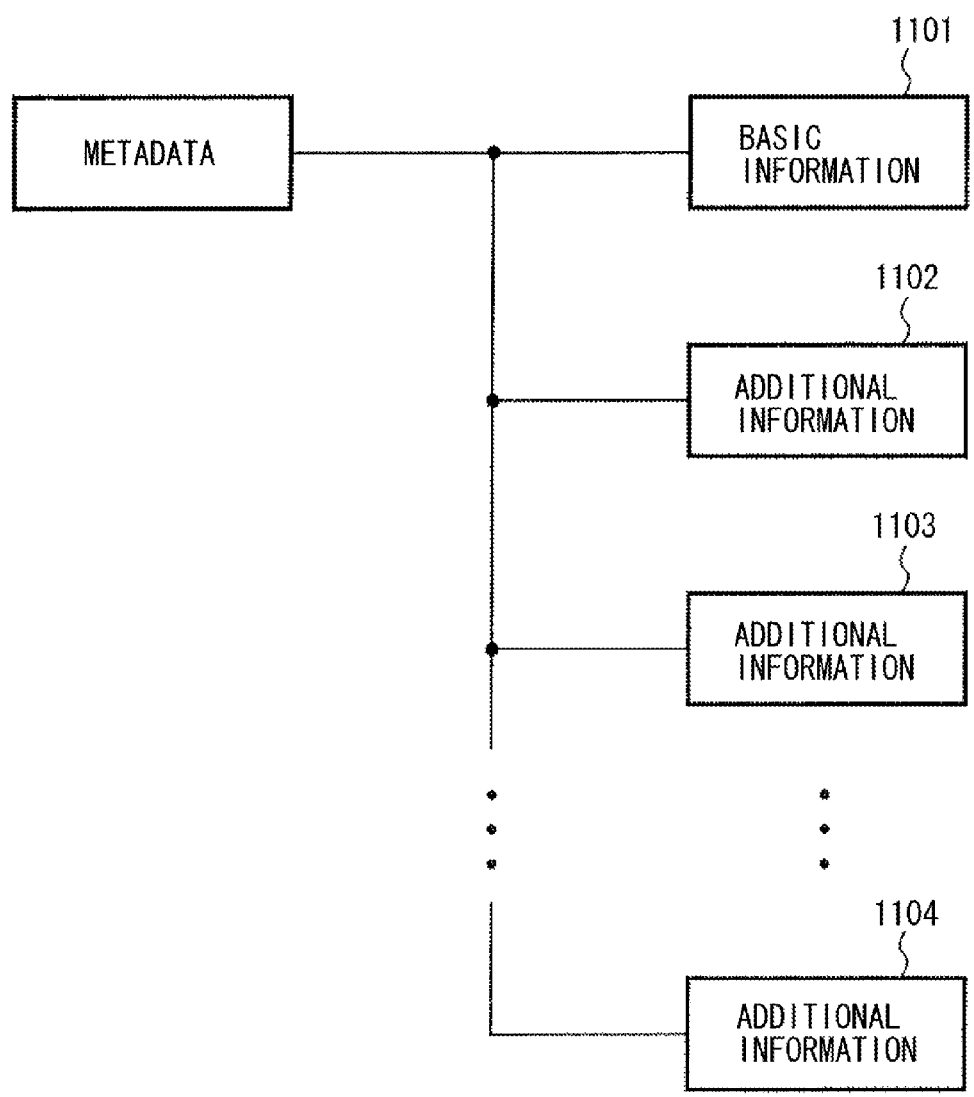
FIG. 11 illustrates an example arrangement of metadata according to an exemplary embodiment of the present invention.

FIG. 11 illustrates a hierarchical arrangement for metadata. For example, basic information 1101 includes date/time information of a document image and creator's name. Additional information 1102, 1103, 1104, etc. includes a shape of the document image. According to the above-described exemplary embodiment, the region information and the region-related information obtained in step S509 are additional information added to the metadata.

The hierarchical arrangement for the metadata is effective to set a security level according to the hierarchy, for example, to discriminate information limited to specific users from information opened to the public.

For example, the description language for the metadata is Extensible Markup Language (XML). Any type of description method is usable.

FIG. 8 illustrates a UI screen 801 of the MFP, which displays segmented regions obtained in a case where the data processing unit 206 performs region segmentation on the document image 604 illustrated in FIG. 6A, adds metadata, performs vectorization processing, and stores the processed data in a BOX.

The document image 604 includes three regions (i.e., the text region 603, the image region 602, and the graphics region 601). The UI screen 801 displays respective regions independently and allows a user, who selects a displayed region, to refer to the contents of each region described by metadata.

If a user selects a plurality of regions and clicks on an EDIT button 802, the data processing unit 206 automatically determines the layout for the selected regions and generates a rearranged document. If a user sends a selected region to a PC, the user can click on a SEND button 803.

Figure 12:
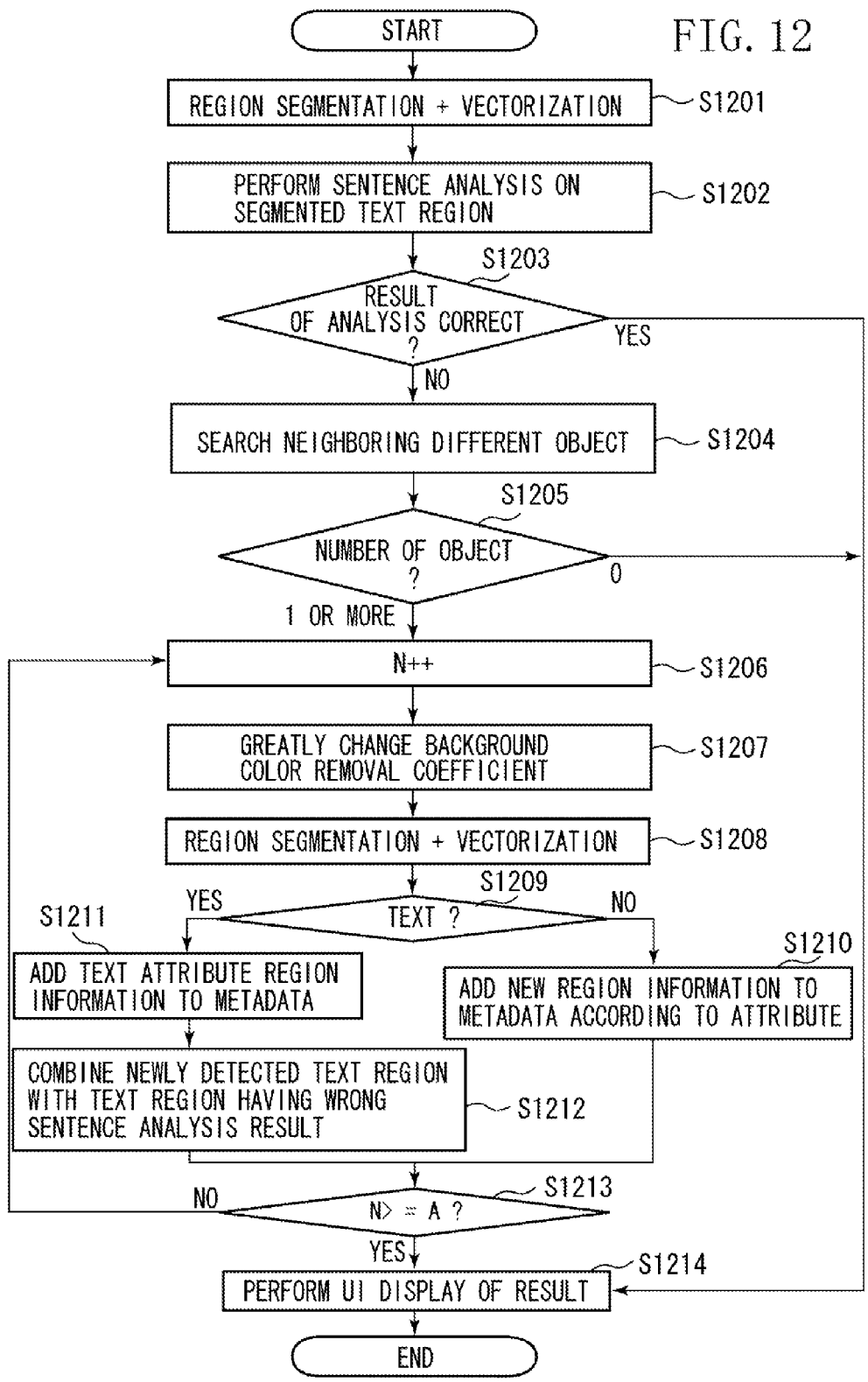
FIG. 12 is a flowchart illustrating example region segmentation processing according to an exemplary embodiment of the present invention.

FIG. 12 is a flowchart illustrating example region segmentation processing according to an exemplary embodiment of the present invention. In step S1201, the data processing unit 206 performs the primary region segmentation and vectorization processing illustrated in FIG. 5 on image data of a document image obtained by the image reading unit 201 (e.g., scanner)

In step S1202, the data processing unit 206 performs sentence analysis on a text region with reference to the metadata added in step S509.

In step S1203, the data processing unit 206 determines whether the result of the sentence analysis performed in step S1202 is correct for each sentence included in the above-described text region. If in step S1203 the data processing unit 206 determines that the analysis result is correct (when the region segmentation processing is successful), the processing proceeds to step S1214. In step S1214, the data processing unit 206 causes the display unit 207 to display a list of segmented regions on its UI screen and terminates the processing of this routine.

If in step S1203 the data processing unit 206 determines that the analysis result is incorrect, the processing proceeds to step S1204. For example, when the data processing unit 206 performs region segmentation processing on an image illustrated in FIG. 3A, the data processing unit 206 obtains segmented regions illustrated in FIG. 3B. FIG. 4 illustrates the segmented regions displayed on the UI screen, according to which a text region 402 includes an erroneously dissected sentence. In this case, if the data processing unit 206 performs sentence analysis on an OCR result of the text region 402, a recognized sentence is meaningless or incomplete. Therefore, the data processing unit 206 determines that the region segmentation processing was unsuccessful. In this manner, the data processing unit 206 detects a text region including an erroneous sentence, if such a defective region is generated by the primary region segmentation.

In step S1204, the data processing unit 206 searches non-text regions existing around the text region with reference to the metadata and identifies the number "A" of the detected non-text regions. More specifically, the data processing unit 206 extracts non-text regions existing around the text region, based on region information and region-related information included in the metadata. Then, the data processing unit 206 stores the number "A" of the detected non-text regions in the RAM of the data processing unit 206. For example, the data processing unit 206 searches neighboring regions around the target text region and designates each detected region as a processing object region.

In step S1205, the data processing unit 206 checks the number of processing object regions. If the number of processing object regions is 0, the processing proceeds to step S1214. In step S1214, the data processing unit 206 causes the display unit 207 to display a list of segmented regions on its UI screen and terminates the processing of this routine. If in step S1205 the number of processing object regions is 1 or more, the processing proceeds to step S1206. In step S1206, the data processing unit 206 sets a counter N to 1. If the data processing unit 206 executes the processing of step S1206 next time, the data processing unit 206 increments the counter N by 1.

More specifically, when the processing proceeds to step S1206 from step S1205, the data processing unit 206 increments a count value (i.e., from "0" to "1") and stores the incremented count value in the RAM of the data processing unit 206. Similarly, when the processing proceeds to step S1206 from step S1213, the data processing unit 206 increments the count value stored in the RAM by 1 and stores the incremented count value in the RAM. The data processing unit 206 successively processes an object region selected from regions in the direction of characters and then successively processes regions in the next character row.

In the above-described exemplary embodiment, it is important to extract a non-text region existing around a text region. The data processing unit 206 executes the processing of step S1204 when a text region includes an incorrect sentence (see the text region 402 illustrated in FIG. 4). In this case, an image region 401 includes a character "I" while the text region 402 includes the rest of an original sentence. More specifically, when a character string straddles on a text region and another attribute region, a part of the original sentence is included in another attribute region while the rest of the original sentence remains in the text region as a result of the primary region segmentation.

The attribute region including a part of the original sentence is as a result of the first region segmentation present in the vicinity of the text region including the incorrect sentence. In FIG. 3B, the image region 303 corresponds to the image region 401 and the text region 304 corresponds to the text region 402. The image region 303 including the character "I" is present around the text region 304 including the incorrect sentence.

The data processing unit 206 performs sentence analysis and determines that the text region 304 is incorrect. The data processing unit 206 searches other regions existing in the row direction of the text region (i.e., in the horizontal direction when the text is horizontal writing). As a result, the data processing unit 206 identifies the image region 303 as an object region. In this manner, the data processing unit 206 extracts a region existing around the text region including the incomplete sentence and performs later-described secondary region segmentation on the extracted region to extract characters. Then, the data processing unit 206 combines the extracted characters to reconstruct the original sentence.

Various methods are usable to "extract a non-text region existing around a text region" according to an image processing apparatus or a system design. For example, the data processing unit 206 can extract a region existing within a predetermined distance (corresponding to predetermined number of pixels) from a target text region as "a non-text region existing around the text region." The data processing unit 206 can extract a plurality of object regions including a target text region and other text regions. The data processing unit 206 can extract a plurality of neighboring regions around the target text region as "non-text regions existing around the text region."

As described above, the data processing unit 206 checks neighboring regions existing around a target region including an incomplete sentence and extracts a candidate region including any character relating to the sentence included in the target region. Then, the data processing unit 206 combines the extracted region with the target region. More specifically, the data processing unit 206 detects, from the regions segmented by the primary region segmentation, a non-text region including a part of the original sentence the rest of which is included in the text region.

Figure 13A:
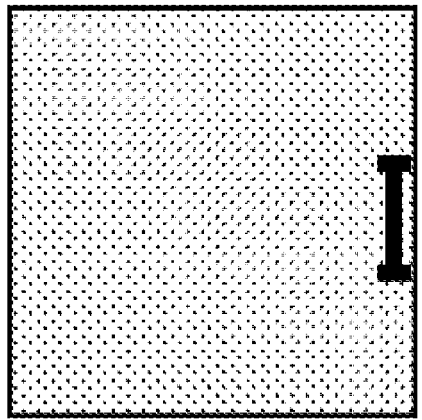
FIGS. 13A and 13B illustrate example removal of a background image according to an exemplary embodiment of the present invention.
Figure 13B:
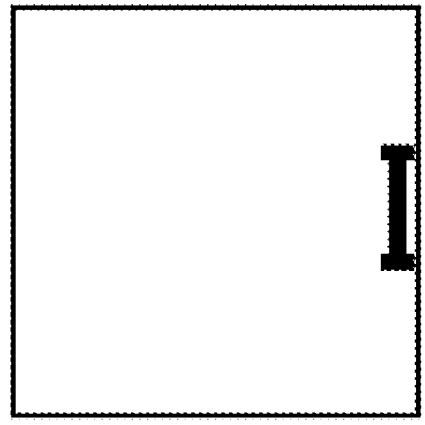

In step S1207, the data processing unit 206 performs emphasized background color removal processing on the first object region (one of the non-text regions existing around the text region), as illustrated in FIG. 13A (a state where a background color is present) and FIG. 13B (a state where the background color is removed). A conventional technique capable of removing a background color is usable. For example, the data processing unit 206 changes a threshold based on a document image color in the object region to remove the background color. Thus, an object region is clearly discriminable from other regions. The data processing unit 206 can easily perform the secondary region segmentation on the target region. According to the example illustrated in FIG. 4, the above-described object region is the image region 401.

In step S1208, the data processing unit 206 performs the secondary region segmentation and vectorization processing on the object region having been subjected to the above-described background color removal processing. The data processing unit 206 separates a plurality of regions included in the object region. According to the example illustrated in FIG. 4, the data processing unit 206 performs the secondary region segmentation on the image region 401 and separates the character "I" from the image region (rectangular region). Then, the data processing unit 206 vectorizes the separated regions.

In the above-described exemplary embodiment, the data processing unit 206 performs background color removal processing (step S1207) on the image region 401 obtained by the primary region segmentation. Therefore, the data processing unit 206 can easily extract characters when the data processing unit 206 again performs the region segmentation. Accordingly, the data processing unit 206 can easily extract characters by executing the secondary region segmentation, even when the color of a character is similar to the background color.

In step S1209, the data processing unit 206 determines whether the region obtained by the secondary region segmentation processing is a text region or a non-text region. If the region obtained by the secondary region segmentation processing is a non-text region (NO in step S1209), the processing proceeds to step S1210. In step S1210, the data processing unit 206 adds new region information to the metadata according to the attribute of the region. If in step S1209 the region obtained by the secondary region segmentation processing is a text region (YES in step S1209), the processing proceeds to step S1211. In step S1211, the data processing unit 206 adds text attribute region information to the metadata for a new text region obtained by the secondary region segmentation. Furthermore, the data processing unit 206 performs OCR processing on the text region to obtain a character recognition result.

In step S1212, with reference to the metadata, the data processing unit 206 compares the text region obtained by the secondary region segmentation with the text region whose sentence analysis result was incorrect. If the data processing unit 206 determines that a correct sentence can be obtained by connecting characters of two text regions, the data processing unit 206 connects the text regions. In step S1213, the data processing unit 206 compares the number "A" of the non-text regions detected in step S1204 with a counter number "N" (a count value stored in the RAM). If the counter number "N" is equal to or greater than the number "A", the processing proceeds to step S1214. Namely, the data processing unit 206 determines that the re-region segmentation (secondary region segmentation) for each detected region is complete.

In step S1214, the data processing unit 206 causes the display unit 207 to display a list of segmented regions on its UI screen and terminates the processing of this routine. In this case, the data processing unit 206 resets the number "N" accumulated in the RAM to 0. On the other hand, if in step S1213 the number "A" is greater than the number "N", the processing returns to step S1206. Namely, the data processing unit 206 determines that the re-region segmentation (secondary region segmentation) for each extracted (detected) region is incomplete. The data processing unit 206 repeats the processing of steps S1206 to S1213 until the number "N" becomes equal to or greater than the number "A."

In step S1202, the data processing unit 206 performs sentence analysis on each text region. However, if a text region includes two or more columns as illustrated in FIG. 14, the data processing unit 206 determines that the sentence analysis result is correct when a correct sentence is obtainable by connecting two or more columns. According to the example illustrated in FIG. 14, a document including two columns is dividable into two text regions 1401 and 1402, which include incomplete sentences respectively. However, if a correct sentence is obtainable by connecting two text regions 1401 and 1402, the data processing unit 206 does not perform the secondary region segmentation on these text regions 1401 and 1402.

Figure 15:
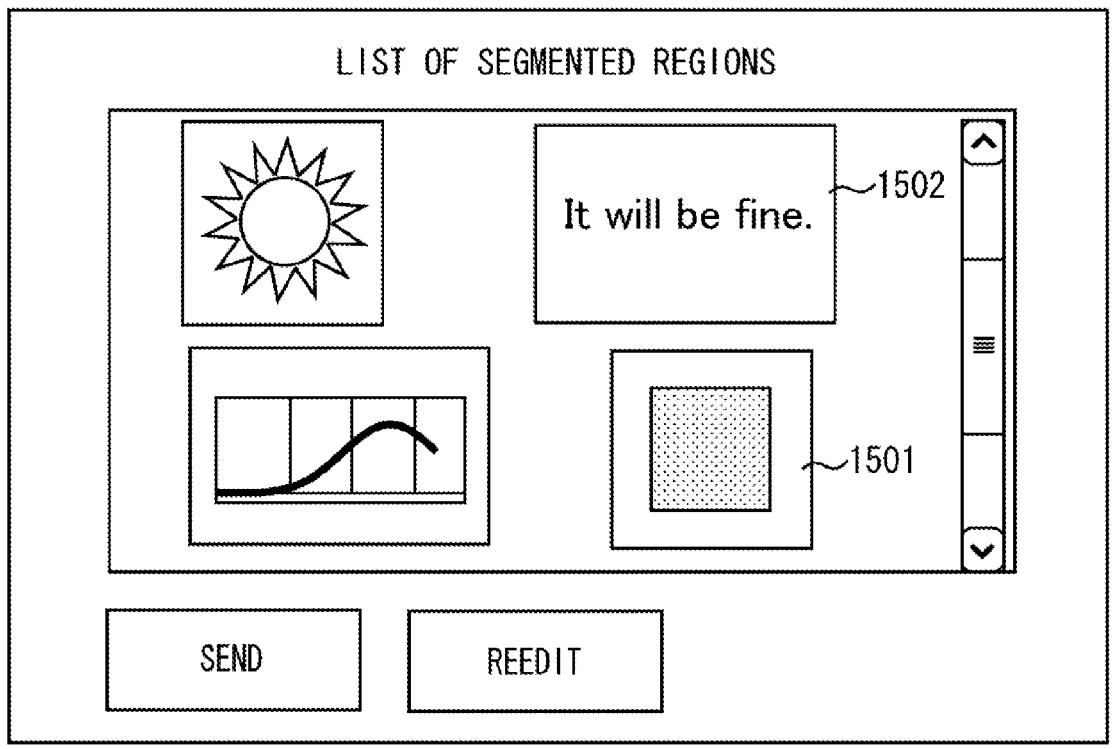
FIG. 15 illustrates an example list of segmented regions displayed on a UI screen of the MFP according to an exemplary embodiment of the present invention.

FIG. 15 illustrates an example UI screen displayed in step S1214. According to the UI display illustrated in FIG. 4, the image region 401 includes a background color and a part of the text region 402 which overlaps with the background color, as a single region. In other words, the region segmentation is unsuccessful. On the other hand, according to the UI display illustrated in FIG. 15, an image region 1501 includes only the background color and does not include any character, while a text region 1502 includes a complete (correct) sentence.

The exemplary embodiment processes a document image obtained by the image reading unit 201 (e.g., a scanner). Another exemplary embodiment processes a document image received from an external apparatus (e.g., the client PC 102) or a document image read from a portable medium.

Second Exemplary Embodiment

Figure 16A:
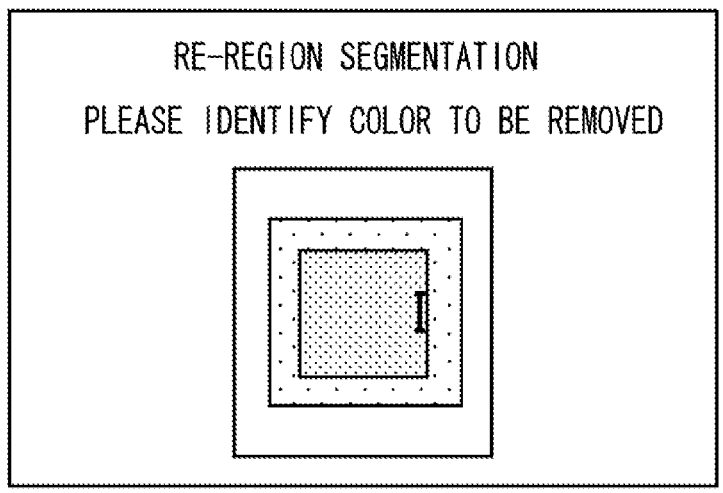
FIGS. 16A to 16C illustrate example images displayed on a UI screen of the MFP according to an exemplary embodiment of the present invention.
Figure 16B:
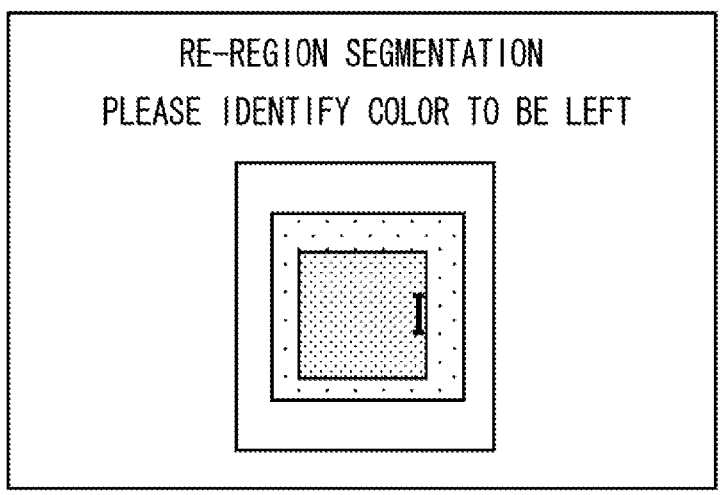
Figure 16C:
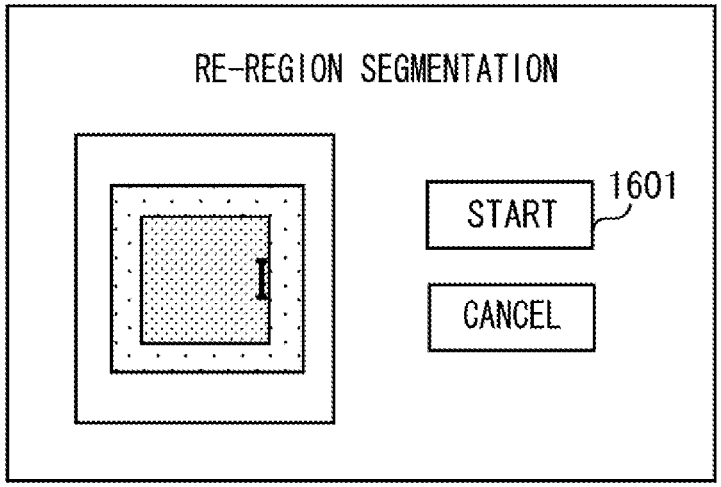
Figure 17:
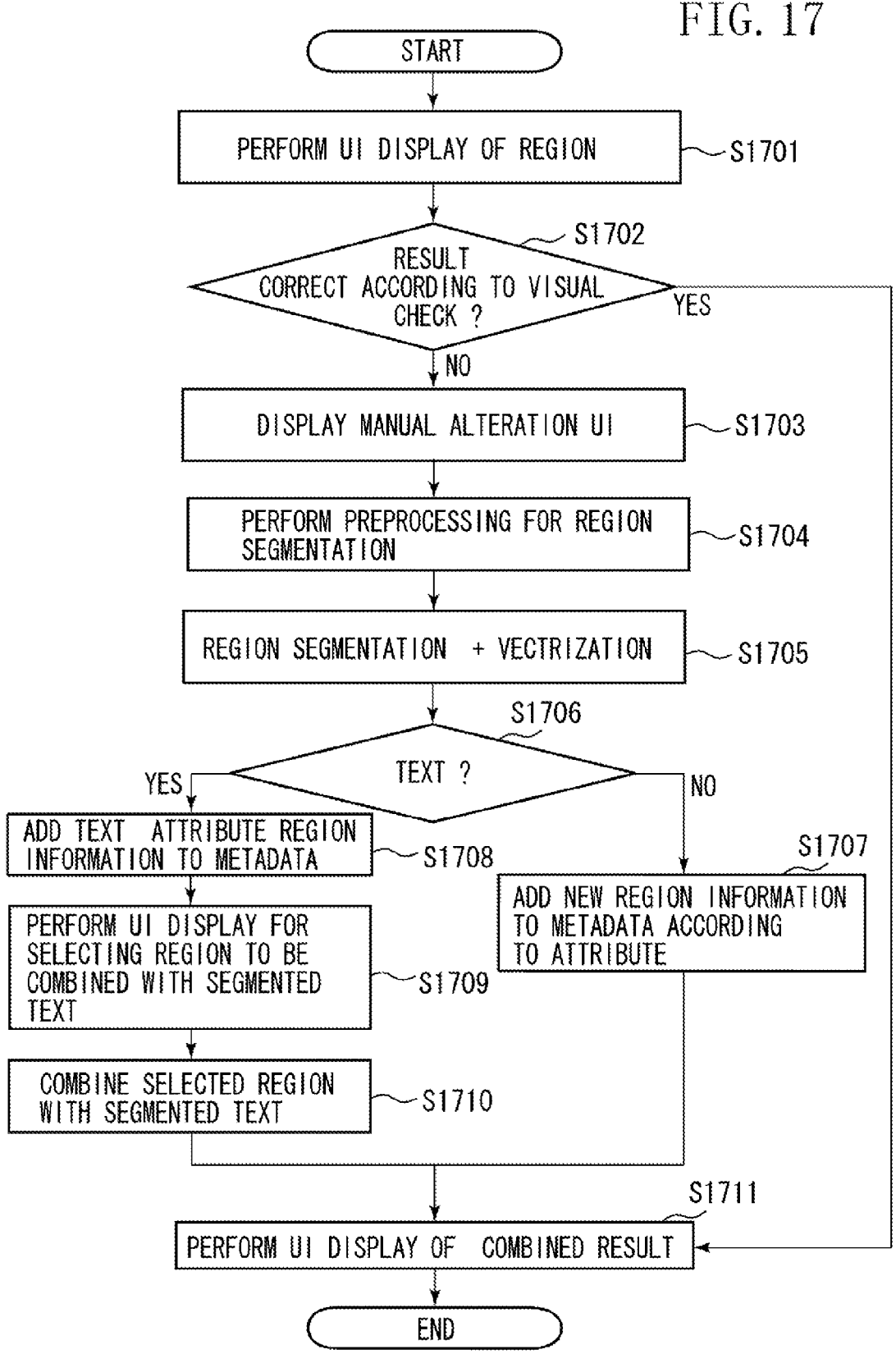
FIG. 17 is a flowchart illustrating example region segmentation processing according to an exemplary embodiment of the present invention.

A second exemplary embodiment of the present invention allows a user to select a region to be subjected to the secondary region segmentation processing. FIG. 17 is a flowchart illustrating example region segmentation processing according to the exemplary embodiment. FIGS. 16A, 16B, and 16C illustrate an example UI screen for the MFP.

In step S1701, the data processing unit 206 causes the display unit 207 to display a UI screen for each of segmented regions obtained by the primary region segmentation processing illustrated in FIG. 5. FIG. 4 illustrates an example screen, which enables a user to determine whether a segmentation result is correct while viewing the screen. If the segmentation result is correct, the user operates the input unit 204 (e.g., a mouse) to click an "OK" button (not illustrated) on the UI screen. In response to depression of the "OK" button, the input unit 204 transmits visually recognized information, which indicates that the segmentation result is correct, to the image processing apparatus.

If a user determines that the segmentation result displayed on the UI screen includes an erroneously segmented region, the user operates the input unit 204 to select and designate the erroneously segmented region as an object for the region segmentation performed again. In response to a user's selection, the input unit 204 transmits visually recognized information, which indicates an object for the region segmentation performed again, to the image processing apparatus.

In step S1702, the data processing unit 206 analyzes the visually recognized information received from the input unit 204 and determines whether the segmentation result is correct. More specifically, if the above-described analysis indicates that the visually recognized information is information indicating correctness of the segmentation result, the processing proceeds to step S1711. In step S1711, the data processing unit 206 determines that segmentation result is correct and terminates the processing of this routine. In step S1711, the data processing unit 206 causes the display unit 207 to display a UI screen similar to that illustrated in FIG. 4.

However, if in step S1702 the above-described analysis indicates that the visually recognized information is information indicating an object for the region segmentation performed again, the data processing unit 206 determines that the segmentation result is incorrect. For example, if the visually recognized information indicates that a user designates the image region 401, the processing proceeds to step S1703.

In step S1703, the data processing unit 206 causes the display unit 207 to display re-region segmentation UI (secondary region segmentation UI) illustrated in FIG. 16A. A user designates a color to be removed (background color). The image processing apparatus inputs to-be-removed color information according to the designation. Next, the user designates a color to be left (character color) on a UI screen illustrated in FIG. 16B. The image processing apparatus inputs to-be-left color information according to the designation. Then, the user clicks on a button 1601 illustrated in FIG. 16C. The data processing unit 206 starts re-region segmentation (secondary region segmentation) according to the depression of the button 1601.

In this manner, the data processing unit 206 selects an object for the region segmentation performed again, from the regions segmented by the primary region segmentation performed on a document image, according to a user's selection.

In step S1704, the data processing unit 206 controls color components to emphasize a portion to be left through binarization based on color information of a region to be removed and color information of a region to be left. In step S1705, the data processing unit 206 performs secondary region segmentation and vectorization on the image region 401, which is similar to the processing in step S1208.

In step S1706, the data processing unit 206 determines whether the region obtained by the above-described secondary region segmentation is a text region or a non-text region. If the data processing unit 206 determines that the obtained region is a non-text region, the processing proceeds to step S1707. In step S1707, the data processing unit 206 adds new region information to the metadata according to the attribute of the region.

If in step S1706 the data processing unit 206 determines that the obtained region is a text region (YES in step S1706), the processing proceeds to step S1708. In step S1708, the data processing unit 206 adds text attribute region information to the metadata for a new text region obtained by the secondary region segmentation. In this case, the data processing unit 206 can perform character recognition processing to add a character recognition processing result to the metadata.

Figure 18A:
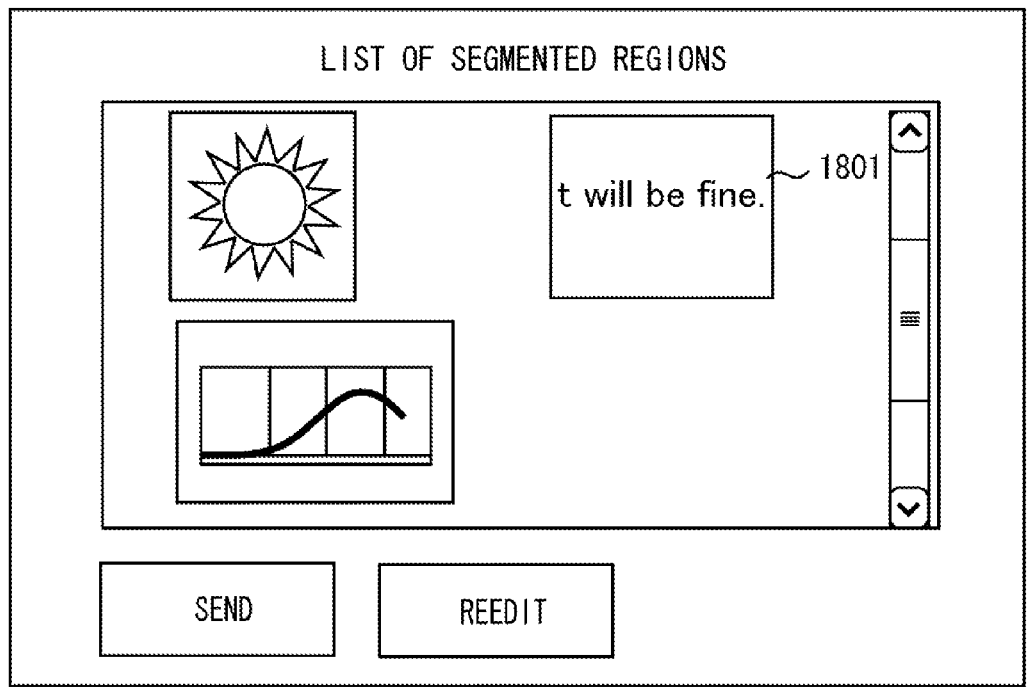
FIGS. 18A and 18B illustrate example images displayed on a UI screen of the MFP according to an exemplary embodiment of the present invention.

In step S1709, the data processing unit 206 causes the display unit 207 to display a UI screen illustrated in FIG. 18A, which enables a user to select a region to be combined with the segmented text. In this case, the user selects a text region 1801. The image processing apparatus receives information designating the text region 1801 selected by the user (i.e., a region to be combined with the text separated by the secondary region segmentation).

Figure 18B:
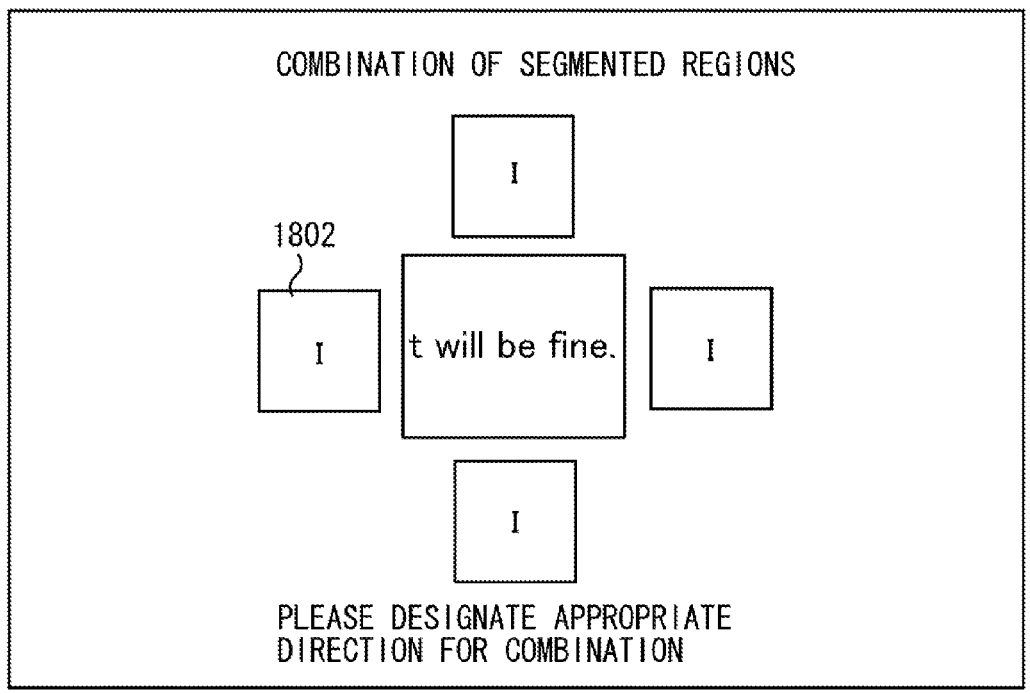

In step S1710, the data processing unit 206 combines the text with the selected text region 1801. In this case, the data processing unit 206 displays a UI screen illustrated in FIG. 18B, which enables a user to select an appropriate direction for combination. According to this example, the user clicks on a button 1802 to reconstruct a correct sentence. The metadata are combinable according to the combination of regions. Furthermore, the metadata can include connected and combined character recognition results.

In step S1711, the data processing unit 206 causes the display unit 207 to display the UI screen illustrated in FIG. 15.

As compared to the first exemplary embodiment, the second exemplary embodiment does not automatically execute all of the primary region segmentation and the reconstruction of an erroneously segmented region. Instead, the second exemplary embodiment enables a user to designate an erroneously segmented region (e.g., a text region). The image processing apparatus performs region segmentation (secondary region segmentation) processing on a region designated by a user to reconstruct a correct region. Accordingly, the second exemplary embodiment can accurately perform the region segmentation.

Considering accuracy in the region segmentation, it is appropriate to modify the first exemplary embodiment to selectively perform the processing of the second exemplary embodiment after completing the processing of the routine illustrated in FIG. 12. For example, an UI screen result displayed in step S1214 may be different from the region segmentation result illustrated in FIG. 15 and similar to the region segmentation result illustrated in FIG. 4. In such a case, the data processing unit 206 can additionally perform the processing of the second exemplary embodiment after completing the processing of step S1214 to let a user select a to-be-corrected region.

According to the above-described exemplary embodiment, after completing the primary region segmentation, the data processing unit 206 performs the secondary region segmentation on a region selected by a user. Therefore, the above-described exemplary embodiment can adequately perform the region segmentation with a smaller memory capacity. Accordingly, the above-described exemplary embodiment can adequately perform the region segmentation, even if a first attribute region is completely involved in a second attribute region.

For example, the data processing unit 206 performs the following processing if an original sentence of a text region is completely involved in an image region.

More specifically, if the image processing apparatus receives visually recognized information relating to an image region involving the whole of a text region from a user, the data processing unit 206 detects the above-described image region from the segmented regions obtained by the primary region segmentation. Then, the data processing unit 206 separates the detected image region into a text region and an image region (i.e., performs secondary region segmentation processing). In this manner, when at least a part of the first attribute region is overlapped with the second attribute region, the data processing unit 206 can separate the portion overlapped with the second attribute region from at least the part of the first attribute region.

Third Exemplary Embodiment

Similar to the UI screen of the MFP, a screen of a host computer connected to the MFP enables a user to perform various operations. More specifically, an external apparatus (e.g., the client PC 102) connected to the MFP 100 can perform processing described in the first and second exemplary embodiments. In this case, a CPU of the external apparatus (e.g., the client PC 102) executes a program stored in a storage device of the external apparatus to realize region segmentation processing according to an exemplary embodiment of the present invention, which is similar to the processing illustrated in FIGS. 5, 12, and 17.

The external apparatus (e.g., the client PC 102), which does not include the image reading unit 201, can input a document image read by a scanner (not illustrated) connected to the LAN 107 or transmitted from the MFP 100 via the LAN 107. Furthermore, the external apparatus can activate a built-in drive to read a document image from the above-described portable media.

Other Exemplary Embodiments

The present invention is applicable to a system including a plurality of devices (e.g., a computer, an interface device, a reader, and a printer) or applicable to a single apparatus such as a multifunctional peripheral, a printer, a facsimile machine.

Furthermore, software program code for realizing the functions of the above-described exemplary embodiments is installable to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses a program code installable on a computer when the computer can realize the functions or processes of the exemplary embodiments.

In this case, the program code itself can realize the functions of the exemplary embodiments. The equivalents of programs are usable if they possess comparable functions. Furthermore, the present invention encompasses supplying program code to a computer with a storage (or recording) medium storing the program code. In this case, the type of program can be any one of object code, interpreter program, and OS script data. A storage medium supplying the program can be selected from any one of a floppy disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

Moreover, an operating system (OS) or other application software running on a computer can execute part or all of actual processing based on instructions of the programs. Additionally, the program code read out of a storage medium is recordable in a memory of a function expansion board equipped in a computer or into a memory of a function expansion unit connected to the computer. In this case, based on an instruction of the program, a CPU provided on the function expansion board or the function expansion unit can execute part or all of the processing to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-242667 filed Sep. 19, 2007, which is hereby incorporated by reference herein in its entirety.

What is claimed is:

1. An image processing apparatus comprising:
   an acquisition unit configured to acquire a document image;
   a primary region segmentation unit configured to segment the acquired document image into a plurality of regions;
   a detection unit configured to detect a text region including an erroneous sentence from the regions segmented by the primary region segmentation unit;
   a secondary region segmentation unit configured to detect a second attribute region partly overlapped with an original sentence of the erroneous sentence, and separate the detected region into the second attribute region and a part of the original sentence; and a combining unit configured to combine the part of the original sentence separated by the secondary region segmentation unit with the text region including the erroneous sentence.

2. The image processing apparatus according to claim 1, further comprising a display unit configured to display the regions segmented by the primary region segmentation unit.

3. The image processing apparatus according to claim 2, further comprising a unit configured to input information relating to the second attribute region partly overlapped with the original sentence, which is selected by a user from the regions displayed by the display unit,
wherein the secondary region segmentation unit detects the second attribute region partly overlapped with the original sentence based on the input information.

4. The image processing apparatus according to claim 3, further comprising a unit configured to input information relating to the text region including the erroneous sentence, which is selected by a user from the regions displayed by the display unit,
wherein the detection unit detects the text region including the erroneous sentence from the regions segmented by the primary region segmentation unit based on the input information.

5. The image processing apparatus according to claim 1, wherein the detection unit performs sentence analysis on each of text regions segmented by the primary region segmentation unit, and detects a text region including an erroneous sentence based on the sentence analysis.

6. The image processing apparatus according to claim 1, wherein the secondary region segmentation unit includes,
a unit configured to extract a non-text region existing around the text region including the erroneous sentence; and
a unit configured to perform region segmentation on the extracted region.

7. An image processing apparatus comprising:
an acquisition unit configured to acquire a document image;
a primary region segmentation unit configured to segment the acquired document image into a plurality of regions;
a display unit configured to display the regions segmented by the primary region segmentation unit;
a unit configured to input information relating to a second attribute region overlapped at least partly with a first attribute region, which is selected by a user from the regions displayed by the display unit; and
a secondary region segmentation unit configured to detect the second attribute region overlapped at least partly with the first attribute region based on the input information, and separate the detected region into the second attribute region and at least a part of the first attribute region.

8. The image processing apparatus according to claim 7, further comprising:
a unit configured to input information relating to at least a part of the first attribute region to be combined with the second attribute region, which is selected by a user from the regions displayed by the display unit;
a detection unit configured to detect at least a part of the first attribute region to be combined with the second attribute region from the regions segmented by the primary region segmentation unit based on the input information, if the first attribute is partly overlapped with the second attribute as a result of segmentation performed by the primary region segmentation unit; and a combining unit configured to combine the region detected by the detection unit with at least a part of the first attribute region segmented by the secondary region segmentation unit.

9. A method for performing region segmentation processing on a document image, the method comprising:
using a processor to perform the steps of,
acquiring a document image;
segmenting the acquired document image into a plurality of regions;
detecting a text region including an erroneous sentence from the segmented regions;
detecting a second attribute region partly overlapped with an original sentence of the erroneous sentence;
separating the detected region into the second attribute region and a part of the original sentence; and
combining the separated part of the original sentence with the text region including the erroneous sentence.

10. The method according to claim 9, further comprising displaying the segmented regions.

11. The method according to claim 10, further comprising:
inputting information relating to the second attribute region partly overlapped with the original sentence, which is selected by a user from the displayed regions; and
detecting the second attribute region partly overlapped with the original sentence based on the input information.

12. The method according to claim 11, further comprising:
inputting information relating to the text region including the erroneous sentence, which is selected by a user from the displayed regions; and
detecting the text region including the erroneous sentence from the segmented regions based on the input information.

13. The method according to claim 9, further comprising:
performing sentence analysis on each of segmented text regions; and
detecting a text region including an erroneous sentence based on the sentence analysis.

14. The method according to claim 9, further comprising:
extracting a non-text region existing around the text region including the erroneous sentence; and
performing region segmentation on the extracted region.

15. A method for performing region segmentation processing on a document image, the method comprising:
using a processor to perform the steps of,
acquiring a document image;
segmenting the acquired document image into a plurality of regions;
displaying the segmented regions;
inputting information relating to a second attribute region overlapped at least partly with a first attribute region, which is selected by a user from the displayed regions;
detecting the second attribute region overlapped at least partly with the first attribute region based on the input information; and
separating the detected region into the second attribute region and at least a part of the first attribute region.

16. The method according to claim 15, further comprising:
inputting information relating to at least a part of the first attribute region to be combined with the second attribute region, which is selected by a user from the displayed regions;
detecting at least a part of the first attribute region to be combined with the second attribute region from the segmented regions based on the input information, if the first attribute is partly overlapped with the second attribute as a result of region segmentation; and combining the detected region with at least a part of the segmented first attribute region.

17. A non-transitory computer-readable storage medium containing computer-executable instructions for causing an image processing apparatus to perform region segmentation processing on a document image, the medium comprising:

computer-executable instructions for acquiring a document image;

computer-executable instructions for segmenting the acquired document image into a plurality of regions;

computer-executable instructions for detecting a text region including an erroneous sentence from the segmented regions;

computer-executable instructions for detecting a second attribute region partly overlapped with an original sentence of the erroneous sentence;

computer-executable instructions for separating the detected region into the second attribute region and a part of the original sentence; and computer-executable instructions for combining the separated part of the original sentence with the text region including the erroneous sentence.

18. A non-transitory computer-readable storage medium containing computer-executable instructions for causing an image processing apparatus to perform region segmentation processing on a document image, the medium comprising:

computer-executable instructions for acquiring a document image;

computer-executable instructions for segmenting the acquired document image into a plurality of regions;

computer-executable instructions for displaying the segmented regions;

computer-executable instructions for inputting information relating to a second attribute region overlapped at least partly with a first attribute region, which is selected by a user from the displayed regions;

computer-executable instructions for detecting the second attribute region overlapped at least partly with the first attribute region based on the input information; and computer-executable instructions for separating the detected region into the second attribute region and at least a part of the first attribute region.

* * * * *